US008114521B2

(12) United States Patent
Kuwata et al.

(10) Patent No.: US 8,114,521 B2
(45) Date of Patent: Feb. 14, 2012

(54) GAS BARRIER LAMINATE

(75) Inventors: Hideki Kuwata, Uji (JP); Takayoshi Okuzu, Uji (JP); Munehiro Miyake, Tokyo (JP); Mitsuo Yoshida, Tokyo (JP); Junji Okamoto, Tokyo (JP); Kunihiko Ozaki, Tokyo (JP); Miyuki Kamoshita, Tokyo (JP); Reiko Ueno, Tokyo (JP)

(73) Assignees: Unitika Ltd., Amagasaki-shi (JP); Toyo Ink Mfg. Co., Ltd., Tokyo (JP)

( * ) Notice: Subject to any disclaimer, the term of this patent is extended or adjusted under 35 U.S.C. 154(b) by 790 days.

(21) Appl. No.: 12/088,135

(22) PCT Filed: Sep. 25, 2006

(86) PCT No.: PCT/JP2006/318949
§ 371 (c)(1),
(2), (4) Date: Mar. 26, 2008

(87) PCT Pub. No.: WO2007/034941
PCT Pub. Date: Mar. 29, 2007

(65) Prior Publication Data
US 2009/0280333 A1 Nov. 12, 2009

(30) Foreign Application Priority Data

Sep. 26, 2005 (JP) ................................ 2005-277925
Aug. 2, 2006 (JP) ................................ 2006-211067

(51) Int. Cl.
*B32B 27/40* (2006.01)
*B05D 1/36* (2006.01)
(52) U.S. Cl. .................. 428/425.9; 428/483; 427/407.1; 427/388.4
(58) Field of Classification Search ............... 428/425.9, 428/483; 427/388.4, 407.1
See application file for complete search history.

(56) References Cited

U.S. PATENT DOCUMENTS

| 5,342,695 | A | 8/1994 | Tsurutani et al. | |
| 6,605,344 | B1 * | 8/2003 | Ohba et al. | 428/332 |
| 7,435,446 | B2 * | 10/2008 | Kamoshita | 427/335 |
| 2003/0124365 | A1 | 7/2003 | Posey et al. | |
| 2004/0053054 | A1 | 3/2004 | Bobovitch et al. | |
| 2006/0009561 | A1 | 1/2006 | Kamoshita et al. | |
| 2006/0054263 | A1 | 3/2006 | Kamoshita | |
| 2007/0224402 | A1 * | 9/2007 | Yoshida et al. | 428/220 |
| 2009/0214854 | A1 * | 8/2009 | Okawara et al. | 428/323 |

FOREIGN PATENT DOCUMENTS

| CN | 1297464 A | 5/2001 |
| CN | 1685024 | 10/2005 |
| EP | 1 086 981 A1 | 3/2001 |
| EP | 1 548 074 A1 | 6/2005 |
| JP | 6 220221 | 8/1994 |
| JP | 7 102083 | 4/1995 |
| JP | 7 205379 | 8/1995 |
| JP | 7 266441 | 10/1995 |
| JP | 8 41218 | 2/1996 |
| JP | 10 237180 | 9/1998 |
| JP | 2000 931 | 1/2000 |
| JP | 2000 63751 | 2/2000 |
| JP | 2000-177771 A | 6/2000 |
| JP | 2000-263681 A | 9/2000 |
| JP | 2001 71425 | 3/2001 |
| JP | 2001 323204 | 11/2001 |
| JP | 2002 20677 | 1/2002 |
| JP | 2002 241671 | 8/2002 |
| JP | 2003 211578 | 7/2003 |
| JP | 2004 115776 | 4/2004 |
| JP | 2004 136281 | 5/2004 |
| JP | 2004 137495 | 5/2004 |
| JP | 2004 315586 | 11/2004 |
| JP | 2004-322625 | 11/2004 |
| JP | 2004 322626 | 11/2004 |
| WO | WO 99/52973 A1 | 10/1999 |
| WO | WO 2004/029168 A1 | 4/2004 |
| WO | WO 2004/089625 A1 | 10/2004 |

OTHER PUBLICATIONS

U.S. Appl. No. 12/088,179, filed Mar. 26, 2008, Kuwata, et al.
U.S. Appl. No. 12/088,092, filed Mar. 26, 2008, Okuzu, et al.
Korean Office Action issued Aug. 27, 2010, in Patent Application No. 10-2008-7010080 (with English-language translation).
Chinese Office Action issued on Apr. 2, 2011 in corresponding Chinese Application No. 200680035432X (with an English Translation).
International Preliminary Report on Patentability and Written Opinion issued on Mar. 26, 2008 in corresponding International Application No. PCT/JP2006/318948 filed on Sep. 25, 2006 (with an English Translation that was issued on Sep. 9, 2008).
United States Office Action issued on Nov. 29, 2010 in co-pending U.S. Appl. No. 12/088,092.
United States Office Action issued on May 12, 2011 in co-pending U.S. Appl. No. 12/088,092.
Extended Supplementary European Search Report issued on Jan. 13, 2009 in corresponding European Application No. 06 810 516.2.
Korean Office Action issued on Mar. 3, 2010 in corresponding Korean Application No. 10-2008-7010078 (with an English Translation).
Korean Office Action issued on Aug. 30, 2010 in corresponding Korean Application No. 10-2008-7010078 (with an English Translation).
Chinese Office Action issued on Jun. 17, 2010 in corresponding Chinese Application No. 200680035442.3 (with an English Translation).

(Continued)

*Primary Examiner* — Thao T. Tran
(74) *Attorney, Agent, or Firm* — Oblon, Spivak, McClelland, Maier & Neustadt, L.L.P.

(57) ABSTRACT

A gas barrier laminate comprising:
a plastic substrate (I);
a gas barrier layer (II) formed from a gas barrier layer-forming coating material (C) containing a polyalcohol-based polymer (A) and a polycarboxylic acid-based polymer (B);
an overcoat layer (III) formed from an overcoat layer-forming coating material (F) containing at least one of a monovalent metal compound (D) and a bivalent or higher metal compound (E); and
a top coat layer (IV) formed from a top coat layer-forming coating material (G); wherein
the gas barrier layer (II) is laminated to the plastic substrate (I), either directly or with an anchor coat layer disposed therebetween, the overcoat layer (III) is laminated on top of the gas barrier layer (II), and the top coat layer (IV) is formed on top of the overcoat layer (III).

19 Claims, No Drawings

OTHER PUBLICATIONS

Chinese Office Action issued on Nov. 25, 2010 in corresponding Chinese Application No. 200680035442.3 (with an English Translation).

Chinese Office Action issued on Apr. 22, 2011 in corresponding Chinese Application No. 200680035442.3 (with an English Translation).

International Search Report issued on Jan. 9, 2007 in corresponding International Application No. PCT/JP2006/318951 filed on Sep. 25, 2006 (with an English Translation).

International Preliminary Report on Patentability and Written Opinion issued on Mar. 26, 2008 in corresponding International Application No. PCT/JP2006/318951 filed on Sep. 25, 2006 (with an English Translation).

United States Office Action issued on Apr. 28, 2011 in co-pending U.S. Appl. No. 12/088,179.

Extended Supplementary European Search Report issued on Jan. 13, 2009 in corresponding European Application No. 06 81 0519.6.

Korean Office Action issued on Feb. 19, 2010 in corresponding Korean Application No. 10-2008-7010073 (with an English Translation).

Korean Office Action issued on Aug. 16, 2010 in corresponding Korean Application No. 10-2003-7010073 (with an English Translation).

Chinese Office Action issued on Mar. 8, 2010 in corresponding Chinese Application No. 200680035422.6 (with an English Translation).

Office Action issued May 31, 2011 in Korea Application No. 2008-7010078 (With English Translation).

Office Action issued on Aug. 24, 2011, in Chinese Patent Application No. 200680035442.3 (with English Translation).

Office Action mailed Oct. 5, 2011, in co-pending U.S. Appl. No. 12/088,179.

* cited by examiner

GAS BARRIER LAMINATE

TECHNICAL FIELD

The present invention relates to a gas barrier laminate that exhibits excellent gas barrier properties even upon storage for an extended period under conditions of high humidity.

BACKGROUND ART

Thermoplastic resin films such as polyamide films and polyester films have excellent strength, transparency and moldability, and are consequently widely used as packaging materials. However, because these thermoplastic resin films also exhibit reasonably high levels of permeability to gases such as oxygen, if this type of thermoplastic resin film is used for packaging general foodstuffs, retort foods, cosmetics, medical supplies, or agricultural chemicals or the like, then during long-term storage, gases such as oxygen can permeate through the film, causing deterioration of the package contents.

As a result, laminated films produced by coating the surface of a thermoplastic resin with an emulsion or the like of polyvinylidene chloride (hereafter abbreviated as PVDC), thereby forming a PVDC layer with good gas barrier properties, are widely used for applications such as food packaging. However, PVDC generates organic substances such as acidic gases on incineration, and with recent advances in environmental awareness, there is considerable demand for replacing PVDC with other materials.

One example of an alternative material to PVDC is polyvinyl alcohol (hereafter abbreviated as PVA), which does not generate toxic gases, and exhibits excellent gas barrier properties under low humidity conditions. However, as the humidity increases, the gas barrier property declines rapidly, so that in most cases, PVA films cannot be used for wrapping foods that contain moisture.

One example of a polymer known to improve upon the deterioration in gas barrier properties seen for PVA under high humidity conditions is a copolymer of vinyl alcohol and ethylene (hereafter abbreviated as EVOH). However, in order to ensure that the gas barrier property is maintained at a practical level under high humidity, the proportion of ethylene within the copolymer must be increased to a certain level, but the resulting polymer becomes difficult to dissolve in water. Accordingly, in order to produce a coating agent using EVOH with a high ethylene ratio within the copolymer, either an organic solvent, or a mixed solvent of water and an organic solvent must be used. However the use of organic solvents is undesirable from an environmental perspective, and also results in increased costs due to the necessity of providing a process for recovering the organic solvent.

Examples of methods that have been proposed for coating a film with a liquid composition comprising a water-soluble polymer in order to achieve favorable gas barrier properties even under conditions of high humidity include methods in which an aqueous solution comprising PVA and a partially neutralized product of polyacrylic acid or polymethacrylic acid is coated onto a film, and a heat treatment is then conducted to effect cross-linking via ester linkages between the two polymers (see patent references 1 to 7). However, in the methods proposed in these references, either a high-temperature heat treatment or a heat treatment over an extended period is required to achieve favorable gas barrier properties, and because large quantities of energy are therefore required during production, the impact on the environment is not insignificant. Moreover, if a high-temperature heat treatment is employed, then not only is there an increased danger of color changes or decomposition of the PVA and the like that constitute the gas barrier layer, but deformation such as wrinkling can occur in the plastic film substrate or the like to which the gas barrier layer is laminated, meaning the product cannot be used as a packaging material. In order to prevent deterioration of the plastic substrate, a special heat-resistant film that is capable of withstanding the high-temperature heat treatment must be used as the substrate, but this creates problems of practicality and economic viability. On the other hand, if the temperature of the heat treatment is lowered, then treatment must be conducted over an extremely long period, causing a deterioration in productivity.

Furthermore, investigations are also being conducted into resolving the above problems associated with PVA film by introducing cross-linking structures into the PVA. However, although the humidity dependence of the oxygen gas barrier property of PVA film typically decreases with increasing cross-linking density, the inherent oxygen gas barrier property of the PVA film under dry conditions tends to deteriorate, meaning it is extremely difficult to achieve a favorable oxygen gas barrier property under high humidity conditions. Cross-linking of polymer molecules generally improves the water resistance, but the gas barrier property describes the ability of the material to prevent the penetration or diffusion of comparatively small molecules such as oxygen, and a favorable gas barrier property can not always be achieved simply by cross-linking the polymer. For example, three dimensional cross-linked polymers such as epoxy resins and phenolic resins do not exhibit effective gas barrier properties.

Methods have also been proposed which, although using a water-soluble polymer such as PVA, are capable of providing gas barrier laminates with favorable gas barrier properties even under high humidity, by conducting heat treatments at lower temperatures or for shorter time periods than those conventionally used (see patent references 8 to 10).

Although using water-soluble polymers, the gas barrier layer-forming coating materials disclosed in the patent references 8 to 10 are able to form gas barrier laminates with superior gas barrier properties to those conventionally obtained, by conducting heating at lower temperatures or for shorter time periods than those employed for the coating agents disclosed in the patent references 1 to 7. However, with the methods disclosed in the patent references 8 to 10, in which an esterification reaction is conducted between the hydroxyl groups of PVA and the COOH groups within an ethylene-maleic acid copolymer, or in which metal cross-linking structures are introduced, there is a limit to the degree of improvement than can be achieved in the gas barrier property under high humidity.

As a result, other methods have been proposed that improve on the above techniques in order to achieve even better gas barrier properties (see patent references 11 to 14). These references disclose that, by heat treating a gas barrier coating material comprising PVA and a composition prepared by partially neutralizing an ethylene-maleic acid copolymer with a specific metal salt, a gas barrier coating can be obtained that is superior to those disclosed in the patent references 8 to 10, and that by heat treating the thus obtained gas barrier coating in the presence of water, or in the presence of water comprising a specific metal ion, an even more superior gas barrier coating can be obtained. Examples of the method used for conducting the heat treatment in the presence of water (or water comprising a specific metal ion) include immersion in hot water, hot water spraying, storage under high humidity conditions, and steam heating, wherein the treatment temperature is preferably not less than 90° C., and the treatment time is preferably not less than 1 minute.

However, in these types of methods, because the film with the gas barrier layer coated thereon must be in contact with water for a comparatively long time, the production process can be expected to be more complex, and the productivity is expected to worsen. Moreover, the effects of heat and water absorption on the film during the treatment step are considerable, meaning that, for example, in those cases where a highly water-absorbent film such as a polyamide is used as the substrate, adverse effects on the product quality such as deformation and curling are a concern.

As described above, although there are increasing demands for further improvements in the gas barrier properties under conditions of high humidity, obtaining a high-quality gas barrier laminate with superior performance in an industrially efficient manner has proven difficult with the conventional technology. Moreover, incorporating a metal compound into the coating agent causes a deterioration in the film-forming properties, and causes a deterioration in the adhesive strength, the heat resistance and the water resistance when a laminated structure (or a laminated product) is prepared with a heat seal layer, meaning performance problems arise in practical applications.

(Patent Reference 1) Japanese Patent Laid-Open No. H06-220221
(Patent Reference 2) Japanese Patent Laid-Open No. H07-102083
(Patent Reference 3) Japanese Patent Laid-Open No. H07-205379
(Patent Reference 4) Japanese Patent Laid-Open No. H07-266441
(Patent Reference 5) Japanese Patent Laid-Open No. H08-041218
(Patent Reference 6) Japanese Patent Laid-Open No. H10-237180
(Patent Reference 7) Japanese Patent Laid-Open No. 2000-000931
(Patent Reference 8) Japanese Patent Laid-Open No. 2001-323204
(Patent Reference 9) Japanese Patent Laid-Open No. 2002-020677
(Patent Reference 10) Japanese Patent Laid-Open No. 2002-241671
(Patent Reference 11) Japanese Patent Laid-Open No. 2004-115776
(Patent Reference 12) Japanese Patent Laid-Open No. 2004-137495
(Patent Reference 13) Japanese Patent Laid-Open No. 2004-136281
(Patent Reference 14) Japanese Patent Laid-Open No. 2004-322626

DISCLOSURE OF INVENTION

An object of the present invention is to provide a gas barrier laminate that exhibits superior gas barrier properties even when stored for an extended period under conditions of high temperature and high humidity, and which is able to be produced in an industrially efficient manner, under milder conditions than those conventionally employed.

The inventors of the present invention discovered that a laminate capable of achieving the above object could be obtained by sequential lamination of a gas barrier layer, formed by applying a gas barrier coating material with a specific resin composition to a plastic substrate and conducting a heat treatment, an overcoat layer comprising a specific metal compound, and a top coat layer, and they were therefore able to complete the present invention.

In other words, the present invention relates to a gas barrier laminate comprising a plastic substrate (I); a gas barrier layer (II) formed from a gas barrier layer-forming coating material (C) containing a polyalcohol-based polymer (A) and a polycarboxylic acid-based polymer (B); an overcoat layer (III) formed from an overcoat layer-forming coating material (F) containing at least one of a monovalent metal compound (D) and a bivalent or higher metal compound (E), and a top coat layer (IV) formed from a top coat layer-forming coating material (G); wherein the gas barrier layer (II) is laminated to the plastic substrate (I), either directly or with an anchor coat layer disposed therebetween, the overcoat layer (III) is laminated on top of the gas barrier layer (II), and the top coat layer (IV) is formed on top of the overcoat layer (III).

Another aspect of the present invention relates to a method for producing a gas barrier laminate, comprising: forming a gas barrier layer (II) on a plastic substrate (I), either directly or with an anchor coat layer disposed therebetween, using a gas barrier layer-forming coating material (C) containing a polyalcohol-based polymer (A) and a polycarboxylic acid-based polymer (B); forming an overcoat layer (III) on top of the gas barrier layer (II) using an overcoat layer-forming coating material (F) containing at least one of a monovalent metal compound (D) and a bivalent or higher metal compound (E); and forming a top coat layer (IV) on top of the overcoat layer (III) using a top coat layer-forming coating material (G).

Another aspect of the present invention relates to a laminated product, comprising the gas barrier laminate according to the aspect of the present invention described above, a laminate adhesive layer (V), and a heat seal layer (VI), wherein the laminate adhesive layer (V) is laminated to either the top coat layer (IV) or the plastic substrate (I) of the gas barrier laminate, either directly or with a printing ink layer disposed therebetween, and the heat seal layer (VI) is laminated to the top of the laminate adhesive layer (V).

Another aspect of the present invention relates to a packaging material that comprises the gas barrier laminate according to the aspect of the present invention described above.

BEST MODE FOR CARRYING OUT THE INVENTION

Gas Barrier Laminate

A gas barrier laminate according to the present invention (hereafter also referred to as simply "the laminate") comprises a plastic substrate (I); a gas barrier layer (II) formed from a gas barrier layer-forming coating material (C) containing a polyalcohol-based polymer (A) and a polycarboxylic acid-based polymer (B); an overcoat layer (III) formed from an overcoat layer-forming coating material (F) containing at least one of a monovalent metal compound (D) and a bivalent or higher metal compound (E), and a top coat layer (IV) formed from a top coat layer-forming coating material (G); wherein these layers are laminated in the order (I) (II) (III) (IV). The gas barrier layer (II) may be either laminated directly to the plastic substrate (I), or may be laminated to the plastic substrate (I) via an anchor coat layer, as represented by plastic substrate/anchor coat layer/gas barrier layer.

By adopting this type of configuration, the present invention is able to provide a gas barrier laminate that exhibits superior gas barrier properties even when stored for an extended period under conditions of high temperature and high humidity, and which is able to be produced in an industrially efficient manner, under milder conditions than those conventionally employed.

<Plastic Substrate (I)>

The plastic substrate (I) is preferably a film-like substrate produced from a heat-moldable thermoplastic resin using a technique such as extrusion molding, injection molding, blow molding, stretch blow molding, or draw molding, although a substrate that has been molded into the shape of a container such as a bottle, a cup, or a tray is also suitable. This plastic substrate (I) may comprise either a single layer, or a plurality of layers produced by simultaneous melt extrusion or some other lamination process.

Examples of the thermoplastic resin used for forming the plastic substrate (I) include olefin-based copolymers, polyesters, polyamides, styrene-based copolymers, vinyl chloride-based copolymers, acrylic copolymers and polycarbonates, and of these, olefin-based copolymers, polyesters and polyamides are preferred.

Examples of olefin-based copolymers include low-, medium-, and high-density polyethylene, linear low-density polyethylene, polypropylene, ethylene-propylene copolymers, ethylene-butene copolymers, ionomers, ethylene-vinyl acetate copolymers, and ethylene-vinyl alcohol copolymers;

examples of polyesters include polylactic acid, polyethylene terephthalate, polybutylene terephthalate, polyethylene terephthalate/isophthalate, polytrimethylene terephthalate, polyethylene naphthalate and polybutylene naphthalate;

examples of polyamides include nylon 6, nylon 6,6, nylon 6,10, nylon 4,6 and meta-xylylene adipamide;

examples of styrene-based copolymers include polystyrene, styrene-butadiene block copolymers, styrene-acrylonitrile copolymers, and styrene-butadiene-acrylonitrile copolymers (ABS resins);

examples of vinyl chloride-based copolymers include polyvinyl chloride and vinyl chloride-vinyl acetate copolymers; and examples of acrylic copolymers include polymethylmethacrylate and methyl methacrylate-ethyl acrylate copolymers.

These thermoplastic resins may be used either alone, or in mixtures of two or more different resins.

Preferred thermoplastic resins include polyamide resins such as nylon 6, nylon 66 and nylon 46; aromatic polyester resins such as polyethylene terephthalate, polyethylene naphthalate, polytrimethylene terephthalate, polybutylene terephthalate and polybutylene naphthalate; aliphatic polyester resins such as polylactic acid; polyolefin resins such as polypropylene and polyethylene; and mixtures thereof.

If required, the above heat-moldable thermoplastic resin may also contain either one, or two or more additives such as pigments, antioxidants, antistatic agents, ultraviolet absorbers, lubricants or preservatives, which can be added in a combined quantity within a range from 0.001 to 5.0 parts by mass per 100 parts by mass of the resin.

Furthermore, in those cases where, as described below, the gas barrier laminate according to the present invention is used for forming a packaging material, in order to ensure adequate strength as a packaging material, any of the various reinforced plastics can be used as the plastic substrate (I) used for forming the gas barrier laminate. In other words, either one or two or more reinforcing fibers such as glass fiber, aromatic polyamide fiber, carbon fiber, pulp, or cotton linter; powdered reinforcing materials such as carbon black or white carbon; or flake-like reinforcing materials such as glass flakes or aluminum flakes can be blended into the thermoplastic resin in a combined quantity within a range from 2 to 150 parts by mass per 100 parts by mass of the thermoplastic resin.

In order to increase the weight, either one, or two or more extenders such as heavy or light calcium carbonate, mica, talc, kaolin, gypsum, clay, barium sulfate, alumina powder, silica powder, or magnesium carbonate may also be blended into the resin using conventional methods, in a combined quantity within a range from 5 to 100 parts by mass per 100 parts by mass of the thermoplastic resin.

In addition, in order to further improve the gas barrier properties, scaly fine inorganic powders such as water-swelling mica or clay may also be blended into the resin using conventional methods, in a combined quantity within a range from 5 to 100 parts by mass per 100 parts by mass of the thermoplastic resin.

<Gas Barrier Layer (II)>

The gas barrier layer (II) is formed from the gas barrier layer-forming coating material (C) containing the polyalcohol-based polymer (A) and the polycarboxylic acid-based polymer (B). By applying this gas barrier layer-forming coating material (C) to the surface of the plastic substrate (I) and then conducting a heat treatment, the two components (A) and (B) undergo cross-linking via ester linkages, forming a gas barrier layer having a dense, cross-linked structure.

The relative blend proportions of the polyalcohol-based polymer (A) and the polycarboxylic acid-based polymer (B) are set such that the molar ratio between OH groups and COOH groups (OH groups/COOH groups) is preferably within a range from 0.01 to 20, even more preferably from 0.01 to 10, even more preferably from 0.02 to 5, and is most preferably from 0.04 to 2. If the proportion of OH groups is smaller than the above range, then there is a danger of a deterioration in the film-forming performance, whereas if the proportion of COOH groups is smaller than the above range, then there is a danger that a cross-linked structure with an adequate cross-linking density to the polyalcohol-based polymer (A) cannot be formed, and the gas barrier properties under high humidity conditions may not manifest satisfactorily.

From the viewpoint of workability, the gas barrier layer-forming coating material (C) is preferably either an aqueous solution or an aqueous dispersion, and is most preferably an aqueous solution. Accordingly, the polyalcohol-based polymer (A) is preferably water-soluble, and the polycarboxylic acid-based polymer (B) is also preferably water-soluble.

The polyalcohol-based polymer (A) is an alcohol-based polymer containing two or more hydroxyl groups within each molecule, preferred examples of which include polyvinyl alcohol, copolymers of ethylene and vinyl alcohol, and sugars.

The saponification degree within the polyvinyl alcohol or copolymer of ethylene and vinyl alcohol is preferably not less than 95 mol %, and is even more preferably 98 mol % or greater, whereas the average polymerization degree is preferably within a range from 50 to 4,000, and is even more preferably from 200 to 3,000.

Examples of sugars that may be used include monosaccharides, oligosaccharides and polysaccharides. These sugars also include sugar alcohols and the various substituted forms or derivatives thereof, and cyclic oligosaccharides such as cyclodextrin. These sugars are preferably soluble in water.

Examples of starches, which are included within the above polysaccharides, include raw starches (unmodified starches) such as wheat starch, corn starch, waxy corn starch, potato starch, tapioca starch, rice starch, ocarina starch and sago starch, as well as all manner of processed starches. Examples of processed starches include physically modified starches, enzymatically modified starches, starches modified by chemical decomposition, chemically modified starches, and grafted starches in which a monomer is graft polymerized to a starch. Of these starches, water-soluble processed starches such as roasted dextrin and glycosylated products of reduced starches in which the reducing terminals have been alcoholized are preferred. The starch may also be in the form of a hydrate. These starches may be used either alone, or in combinations of two or more different materials.

The aforementioned polyalcohol-based polymer (A) may use either a single compound, or a combination of two or more different compounds.

The polycarboxylic acid-based polymer (B) is a polymer (BP) containing carboxyl groups or acid anhydride groups, obtained by polymerizing a monomer (BM) containing a carboxyl group or acid anhydride group and an ethylenic unsaturated double bond. The monomer (BM) preferably contains an acryloyl group or methacryloyl group (hereafter, these groups are referred to jointly as a (meth)acryloyl group) as the ethylenic unsaturated double bond. Examples of the monomer include (meth)acrylic acid, 2-carboxyethyl (meth) acrylate, ω-carboxy-polycaprolactone mono(meth)acrylate, maleic acid, maleic anhydride, fumaric acid, fumaric anhydride, citraconic acid, citraconic anhydride, itaconic acid, and itaconic anhydride. Of these, (meth)acrylic acid, maleic acid, maleic anhydride, itaconic acid and itaconic anhydride are preferred.

These monomers may be used alone or in combinations of two or more different monomers, or may also be used in a combination with another monomer. In other words, examples of the polymer (BP) obtained by polymerizing the monomer (BM) include homopolymers (BP1) obtained by polymerization of any one of the monomers (BM), copolymers (BP2) obtained by copolymerization of a plurality of the monomers (BM), and copolymers (BP3) obtained by copolymerization of a monomer (BM) and another monomer.

Examples of other monomers that can be copolymerized with the monomer (BM) include any monomer that does not contain a carboxyl group or hydroxyl group, but is able to undergo copolymerization with the monomer (BM). Examples include esterified products of unsaturated monocarboxylic acids such as crotonic acid or (meth)acrylic acid that do not contain a hydroxyl group or carboxyl group, (meth)acrylamide, (meth)acrylonitrile, styrene, styrenesulfonic acid, vinyltoluene, α-olefins of 2 to 30 carbon atoms such as ethylene, alkyl vinyl ethers, and vinylpyrrolidone. These other monomers may be used either alone, or in combinations of two or more different monomers.

The coating material (C) may include arbitrary combinations of homopolymers (BP1), copolymers of BM monomers (BP2), and copolymers of a BM monomer and another monomer (BP3), and for example, may include two or more homopolymers (BP1), two or more copolymers (BP2), or two or more copolymers (BP3). Alternatively, other combinations such as a homopolymer (BP1) and a copolymer (BP2), a homopolymer (BP1) and a copolymer (BP3), a copolymer (BP2) and a copolymer (BP3), or a homopolymer (BP1), a copolymer (BP2) and a copolymer (BP3) may also be used.

One example of a polymer (BP) that can be used favorably is an olefin-maleic acid copolymer, and an ethylene-maleic acid copolymer (hereafter abbreviated as "EMA") is particularly desirable. This EMA can be obtained by copolymerization of maleic anhydride and ethylene, using known methods such as a solution radical polymerization.

The maleic acid units in EMA tend to form maleic anhydride structures under dry conditions via a cyclodehydration of adjacent carboxyl groups, but then undergo ring opening to form maleic acid structures under humid conditions or within an aqueous solution. Accordingly, unless stated otherwise, the combination of maleic acid units and maleic anhydride units is referred to generically using the term maleic acid units. The maleic acid units in the EMA preferably represent not less than 5 mol %, even more preferably 20 mol % or greater, even more preferably 30 mol % or greater, and most preferably 35 mol % or greater.

The weight average molecular weight of the EMA is preferably within a range from 1,000 to 1,000,000, even more preferably from 3,000 to 500,000, even more preferably from 7,000 to 300,000, and is most preferably from 10,000 to 200,000.

The polycarboxylic acid-based polymer (B) may use either a single polymer, or a combination of two or more different polymers.

In order to promote the cross-linking reaction between the polyalcohol-based polymer (A) and the polycarboxylic acid-based polymer (B), and improve the gas barrier properties, a cross-linking agent may be added to the gas barrier layer-forming coating material (C).

The quantity added of the cross-linking agent is preferably within a range from 0.1 to 30 parts by mass, and even more preferably from 1 to 20 parts by mass, per 100 parts by mass of the combination of the polyalcohol-based polymer (A) and the polycarboxylic acid-based polymer (B). If the quantity added of the cross-linking agent is less than 0.1 parts by mass, then the addition of the cross-linking agent yields no marked cross-linking effect compared with the case where no cross-linking agent is added, whereas if the quantity exceeds 30 parts by mass, then the cross-linking agent may actually impede the development of gas barrier properties, both of which are undesirable.

The above cross-linking agent may be a cross-linking agent with self cross-linking properties, a compound that contains a plurality of functional groups within each molecule capable of reacting with carboxyl groups and/or hydroxyl groups, or a metal complex with polyvalent coordination sites. Of these, isocyanate compounds, melamine compounds, urea compounds, epoxy compounds, carbodiimide compounds and zirconium salt compounds and the like are preferred, as they yield superior gas barrier properties. A plurality of these cross-linking agents may also be used in combination.

Alternatively, a catalyst such as an acid may be added to the coating material (C) in order to accelerate the cross-linking reaction and improve the gas barrier properties.

Adding a cross-linking agent or a catalyst accelerates the cross-linking reaction that occurs via the formation of ester linkages between the polyalcohol-based polymer (A) and the polycarboxylic acid-based polymer (B), and is therefore able to further improve the gas barrier properties of the resulting gas barrier layer (II).

Moreover, additives such as heat stabilizers, antioxidants, reinforcing materials, pigments, age resistors, weatherproofing agents, flame retardants, plasticizers, release agents and lubricants may also be added to the gas barrier layer-forming coating material (C), provided such addition does not significantly impair the characteristics of the coating material.

Examples of the above heat stabilizers, antioxidants and age resistors include hindered phenols, phosphorus compounds, hindered amines, sulfur compounds, copper compounds, alkali metal halides, and mixtures thereof.

Examples of reinforcing materials include clay, talc, calcium carbonate, zinc carbonate, wollastonite, silica, alumina, magnesium oxide, calcium silicate, sodium aluminate, sodium aluminosilicate, magnesium silicate, glass balloons, carbon black, zinc oxide, zeolite, hydrotalcite, metal fibers, metal whiskers, ceramic whiskers, potassium titanate whiskers, boron nitride, graphite, glass fiber, and carbon fiber.

In addition, an inorganic layered compound may also be added to the gas barrier layer-forming coating material (C) in order to further improve the gas barrier properties, provided such addition does not significantly impair the characteristics of the coating material. Here, the term "inorganic layered compound" refers to an inorganic compound in which unit crystal layers are superimposed to form a layered structure. Specific examples include zirconium phosphate (a phosphate-based derivative compound), chalcogenides, lithium-aluminum composite hydroxides, graphite, and clay minerals. Compounds that swell and undergo cleavage within solvents are preferred.

Examples of preferred clay minerals include montmorillonite, beidellite, saponite, hectorite, sauconite, vermiculite, fluoromica, muscovite, paragonite, phlogopite, biotite, lepidolite, margarite, clintonite, anandite, chlorite, donbassite, sudoite, cookeite, clinochlore, chamosite, nimite, tetrasilylic mica, talc, pyrophyllite, nacrite, kaolinite, halloysite, chrysotile, sodium taeniolite, xanthophyllite, antigorite, dickite, and hydrotalcite, and of these, swelling fluoromica or montmorillonite are particularly preferred.

These clay minerals may be naturally formed materials, artificially synthesized or modified materials, or compounds that have been treated with organic materials such as onium salts.

Of the above clay minerals, a swelling fluoromica-based mineral is the most preferred compound in terms of its degree of whiteness, and such minerals can be represented by the formula (1) shown below, and can be readily synthesized.

$$\alpha(MF) \cdot \beta(aMgF_2 \cdot bMgO) \cdot \gamma SiO_2 \quad (1)$$

(In the formula, M represents sodium or lithium, and $\alpha$, $\beta$, $\gamma$, a, and b each represent a coefficient, wherein $0.1 \leq \alpha \leq 2$, $2 \leq \beta \leq 3.5$, $3 \leq \gamma \leq 4$, $0 \leq a \leq 1$, $0 \leq b \leq 1$, and $a+b=1$.)

One method of producing this type of swelling fluoromica-based mineral is a so-called melt method, wherein silicon oxide, magnesium oxide, and various fluorides are mixed together, the resulting mixture is heated at 1,400 to 1,500° C. in an electric or gas oven until the components have completely melted, and crystals of the fluoromica-based mineral are then grown within the reaction vessel during the cooling process.

An alternative method uses talc as a starting material, and involves intercalating alkali metal ions within the talc to generate a swelling fluoromica-based mineral (Japanese Patent Laid-Open No. H02-149415). In this method, the talc is mixed with an alkali silicofluoride or an alkali fluoride, and the mixture is then subjected to a short heat treatment in a magnetic crucible at a temperature of approximately 700 to 1,200° C., thereby yielding the swelling fluoromica-based mineral.

In this method, from the viewpoint of achieving a favorable production yield for the swelling fluoromica-based mineral, the quantity of the alkali silicofluoride or alkali fluoride mixed with the talc preferably represents 10 to 35% by mass of the resulting mixture.

In order to enable the above swelling fluoromica-based mineral to be obtained, the alkali metal of the alkali silicofluoride or alkali fluoride must be either sodium or lithium. These alkali metals may be used either alone, or in combination. Of the alkali metals, if potassium is used alone, then a swelling fluoromica-based mineral cannot be obtained, although potassium can be used in limited quantities in combination with either sodium or lithium, for the purpose of regulating the swelling characteristics.

In addition, a small quantity of alumina may also be added during production of the swelling fluoromica-based mineral to regulate the swelling characteristics of the produced swelling fluoromica-based mineral. Of the above clay minerals, montmorillonite is represented by a formula (2) shown below, and can be obtained by purifying naturally occurring material.

$$M_a Si_4(Al_{2-a}Mg_a)O_{10}(OH)_2 \cdot nH_2O \quad (2)$$

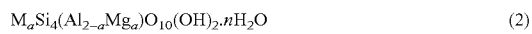

(In the formula, M represents a sodium cation, and a represents a number within a range from 0.25 to 0.60. Furthermore, the number of water molecules bonded to the interlayer ion exchange cations varies depending on the nature of the cations and conditions such as the humidity, and this variability is expressed by the $nH_2O$ in the formula.)

Montmorillonite also includes the homoionic substituted materials of magnesian montmorillonite (3), iron montmorillonite (4), and iron magnesian montmorillonite (5), as represented by the group of formulas (3) to (5) shown below, and these materials may also be used.

$$M_a Si_4(Al_{1.67-a}Mg_{0.5+a})O_{10}(OH)_2 \cdot nH_2O \quad (3)$$

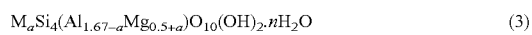

$$M_a Si_4(Fe_{2-a}^{3+}Mg_a)O_{10}(OH)_2 \cdot nH_2O \quad (4)$$

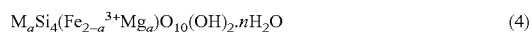

$$M_a Si_4(Fe_{1.67-a}^{3+}Mg_{0.5+a})O_{10}(OH)_2 \cdot nH_2O \quad (5)$$

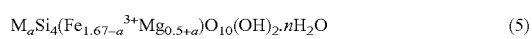

(In the formulas, M represents a sodium cation, and a represents a number within a range from 0.25 to 0.60.)

Normally, montmorillonite contains ion exchange cations such as sodium or calcium between the layers of the material, but the quantity of these cations varies depending on the location from which the material is sourced. In the present invention, a montmorillonite in which an ion exchange process or the like has been used to substitute these interlayer ion exchange cations with sodium is preferred. Furthermore, the use of montmorillonite that has been purified by water treatment is also preferred.

These types of inorganic layered compounds may also be added to the gas barrier layer-forming coating material (C) in combination with the aforementioned cross-linking agent.

When mixing the polyalcohol-based polymer (A) and the polycarboxylic acid-based polymer (B) to prepare an aqueous solution containing the two components that is then used as the coating material (C), an alkali compound is preferably added in sufficient quantity to provide from 0.1 to 20% equivalence relative to the carboxyl groups within the polycarboxylic acid-based polymer (B).

If the polycarboxylic acid-based polymer (B) contains a large quantity of carboxylic acid units, then the hydrophilicity of the polymer itself is high, and an aqueous solution can be formed without the addition of an alkali compound, but by adding an appropriate quantity of an alkali compound, the gas barrier properties of the film obtained by applying the gas barrier layer-forming coating material (C) can be improved markedly.

The alkali compound may be any compound capable of neutralizing the carboxyl groups within the polycarboxylic acid-based polymer (B), and examples include the hydroxides of alkali metals and alkaline earth metals, as well as ammonium hydroxide and organic ammonium hydroxides. Of these, alkali metal hydroxides are preferred.

The method used for preparing the above aqueous solution may be a conventional method that uses a dissolution tank fitted with a stirrer. For example, in a preferred method, aqueous solutions of the polyalcohol-based polymer (A) and the polycarboxylic acid-based polymer (B) are prepared separately, and then mixed together prior to use. In such cases, adding an aforementioned alkali compound to the aqueous solution of the polycarboxylic acid-based polymer (B) can be used to improve the stability of the aqueous solution.

The polyalcohol-based polymer (A) and the polycarboxylic acid-based polymer (B) may also be added simultaneously to water within a dissolution tank, but adding the alkali compound to the water first improves the solubility of the polycarboxylic acid-based polymer (B).

In order to enhance the solubility of the polycarboxylic acid-based polymer (B) in water, shorten the drying process, and improve the stability of the aqueous solution, a small quantity of an alcohol or organic solvent may be added to the water.

The concentration, namely the solid fraction, of the gas barrier layer-forming coating material (C) can be suitably adjusted in accordance with the specifications of the coating device, and/or the drying and heating device, although if the solution is overly dilute, then forming a thick enough layer (II) to ensure a satisfactory gas barrier property becomes difficult, and the subsequent drying process tends to require a long period of time. In contrast, if the concentration of the coating material is too high, then achieving a homogenous coating material becomes difficult, and coatability problems tend to develop. Considering these factors, the concentration (the solid fraction) of the coating material (C) is preferably within a range from 5 to 50% by mass.

When forming the gas barrier layer (II) from the gas barrier layer-forming coating material (C), the coating material is first applied to the plastic substrate (I) or the anchor coat layer formed on top of the plastic substrate (I). There are no particular restrictions on the coating method used for applying the coating material (C), and typical methods such as gravure roll coating, reverse roll coating, wire bar coating and air knife coating can be used.

Following application of the coating material (C), a heat treatment may be conducted immediately, thereby forming a dried coating and conducting a heat treatment simultaneously, or alternatively, the moisture and the like may be evaporated following application to first form a dried coating, by blowing hot air using a dryer or the like, or by irradiating infrared radiation, and a heat treatment then conducted subsequently. In terms of shortening the process, conducting the heat treatment immediately following coating is preferred, provided this does not impair the state of the gas barrier layer (II) or the physical properties such as the gas barrier property. There are no particular restrictions on the heat treatment method, and although conducting the heat treatment in a dry atmosphere such as an oven is considered typical, the heat treatment may also be conducted, for example, by bringing the coating into contact with a heated roller. In those cases where the substrate (I) is a stretched film, during formation of the gas barrier layer (II) from the gas barrier layer-forming coating material (C), either the coating material (C) may be applied to a stretched substrate (I), or the coating material (C) may be applied to the substrate (I) prior to stretching, and film stretching then conducted following coating.

In either of the above cases, by subjecting the plastic substrate (I) with the gas barrier layer-forming coating material (C) coated thereon to a heat treatment of not more than 1 minute within a heated atmosphere of at least 100° C., the polyalcohol-based polymer (A) and the polycarboxylic acid-based polymer (B) contained within the gas barrier layer-forming coating material (C) undergo a cross-linking reaction that forms ester linkages, and as a result of this cross-linking, the water-insoluble gas barrier layer (II) is formed.

The heat treatment conditions are affected by factors such as the ratio between the polyalcohol-based polymer (A) and the polycarboxylic acid-based polymer (B), the existence of other added components, and the quantity of such added components if included, and although it is impossible to generalize regarding the ideal heat treatment temperature for forming the gas barrier layer, the heat treatment is preferably conducted at a temperature within a range from 100 to 300° C., even more preferably from 120 to 250° C., even more preferably from 140 to 240° C., and most preferably from 160 to 220° C. If the heat treatment temperature is too low, then the cross-linking reaction between the polyalcohol-based polymer (A) and the polycarboxylic acid-based polymer (B) may not proceed satisfactorily, making it difficult to obtain a gas barrier layer (II) with satisfactory gas barrier properties, whereas if the temperature is too high, then there is a danger that the coating may become brittle, both of which are undesirable.

The heat treatment time is preferably not longer than 5 minutes, is typically within a range from 1 second to 5 minutes, preferably from 3 seconds to 2 minutes, and even more preferably from 5 seconds to 1 minute. If the heat treatment time is too short, then the above cross-linking reaction may not proceed satisfactorily, making it difficult to obtain a gas barrier layer (II) with satisfactory gas barrier properties, whereas if the heat treatment time is too long, the productivity may deteriorate.

In the present invention, the comparatively short heat treatment described above enables the formation of cross-linked structures based on ester linkages between the polyalcohol-based polymer (A) and the polycarboxylic acid-based polymer (B), thereby enabling the formation of the gas barrier layer (II).

In order to achieve a satisfactory improvement in the gas barrier properties, the thickness of the formed gas barrier layer (II) is preferably thicker than 0.05 μm. On the other hand, in order to ensure superior gas barrier properties under conditions of high temperature and high humidity, by forming cross-linked structures via the reaction between the gas barrier layer (II) and the monovalent metal compound (D) and/or bivalent or higher metal compound (E) of the overcoat layer (III), the gas barrier layer (II) is preferably not too thick, as an overly thick layer causes a deterioration in the metal cross-linking rate of the gas barrier layer (II), meaning the gas barrier properties under conditions of high temperature and high humidity are prone to deterioration.

Accordingly, although the thickness varies depending on the coating conditions, making it difficult to generalize, the thickness of the gas barrier layer (II) is preferably within a range from 0.05 to 3 μm, even more preferably from 0.05 to 2 μm, and is most preferably within a range from 0.08 to 1 μm. If the thickness of the gas barrier layer (II) is less than 0.05 μm, then forming a layer of uniform thickness becomes problematic. In contrast, if the thickness exceeds 3 μm, then the heat treatment time may lengthen, and there is a danger of a deterioration in the productivity.

<Anchor Coat Layer>

An anchor coat layer may be used as required, is positioned between the plastic substrate (I) and the gas barrier layer (II), and has a principal role of improving the adhesion of the gas barrier layer (II).

The coating agent used in the anchor coat layer can use conventional materials without any particular restrictions. Examples include isocyanate-based, polyurethane-based, polyester-based, polyethyleneimine-based, polybutadiene-based, polyolefin-based and alkyl titanate-based anchor coating agents. Of these, in view of achieving superior effects for the present invention, isocyanate-based, polyurethane-based and polyester-based anchor coating agents are preferred.

Moreover, mixtures and reaction products of either one, or two or more isocyanate compounds, polyurethanes or urethane prepolymers; mixtures and reaction products of one, or two or more polyesters, polyols or polyethers, and an isocyanate; or solutions or dispersions thereof are preferred.

The coating agent can be applied to the substrate (I) using the same method as the coating method used for the coating material (C).

<Overcoat Layer (III)>

The overcoat layer (III) is a resin layer that is formed on top of the gas barrier layer (II) using an overcoat layer-forming coating material (F) that contains a monovalent metal compound (D) and/or a bivalent or higher metal compound (E).

The overcoat layer (III) is preferably formed by applying the overcoat layer-forming coating material (F) to the surface of the gas barrier layer (II), and subsequently conducting a heat treatment.

The monovalent metal compound (D) and/or bivalent or higher metal compound (E) within the overcoat layer (III) reacts with the polyalcohol-based polymer (A) or polycarboxylic acid-based polymer (B) within the gas barrier layer (II), forming cross-linked structures and therefore markedly improving the gas barrier properties of the laminate. The cross-linked structures formed by the reaction of the monovalent metal compound (D) and/or bivalent or higher metal compound (E) with the polyalcohol-based polymer (A) or the polycarboxylic acid-based polymer (B) may be coordination bonds, or the more obvious ionic or covalent bonds.

In the present invention, these metal compounds are incorporated into the resin layer, and applied as a resin coating material, which is subsequently subjected to a heat treatment. By employing this method, superior gas barrier properties and transparency can be imparted to the laminate more easily, and in a more industrially efficient manner, than the case where the metal compound is applied as an aqueous solution and then subjected to a heat treatment.

Examples of metals that may be used in the monovalent metal compound (D) include Li, Na, K, Rb and Se, of these, Li, Na and K are preferred, and of these, Li is the most desirable. The form of the metal compound used includes simple metals, as well as inorganic salts such as oxides, hydroxides, halides, carbonates and sulfates, and organic acid salts such as carboxylates and sulfonates. Of these, hydroxides and carbonates are preferred.

Examples of the metal within the bivalent or higher metal compound (E) include Mg, Ca, Zn, Cu, Co, Fe, Ni, Al, and Zr. Of these, Mg, Ca and Zn are preferred, and Mg and Ca are particularly desirable. The form of the metal compound used includes simple metals, as well as inorganic salts such as oxides, hydroxides, halides, carbonates and sulfates, and organic acid salts such as carboxylates and sulfonates. Of these, oxides, hydroxides and carbonates are preferred.

These metal compounds ((D) and/or (E)) may be used either alone, or in combinations of two or more different compounds, and for example, a plurality of compounds (D) and/or a plurality of compounds (E) may be used.

The blend ratio of the metal compound ((D) and/or (E)) within the overcoat layer-forming coating material (F) varies considerably depending on factors such as the type of metal used, the form of the compound, and the type of resin used in forming the overcoat layer-forming coating material (F), but the quantity of the metal compound relative to 100 parts by mass of the solid fraction of the resin used in forming the overcoat layer-forming coating material (F) (or in those cases where a cross-linking agent is use, the combined solid fraction of the resin and the cross-linking agent) is preferably within a range from 0.1 to 100 parts by mass, even more preferably from 0.5 to 80 parts by mass, even more preferably from 0.75 to 75 parts by mass, and is most preferably from 1 to 65 parts by mass. If the blend quantity of the metal compound is less than 0.1 parts by mass, then the quantity of cross-linked structures formed by reaction with the polyalcohol-based polymer (A) or polycarboxylic acid-based polymer (B) within the gas barrier layer (II) would decrease, meaning there is a danger of a deterioration in the gas barrier properties. In contrast, if the blend quantity of the metal compound exceeds 100 parts by mass, then the adhesion, heat resistance and water resistance of the formed overcoat layer (III) are prone to deterioration.

The overcoat layer-forming coating material (F) may be an organic solvent-based coating liquid (solution), an aqueous solution, or an aqueous dispersion. From the viewpoint of the gas barrier properties, and in terms of promoting the ionization of the metal, the overcoat layer-forming coating material (F) is preferably an aqueous solution or aqueous dispersion.

However, in those cases where a monovalent metal compound (D) and/or bivalent or higher metal compound (E) that exhibits a comparatively high level of solubility in water is used, there is a danger that the water resistance of the overcoat layer (III) formed from the overcoat layer-forming coating material (F) may deteriorate. Moreover, in those cases where a basic monovalent metal compound (D) and/or bivalent or higher metal compound (E) is used, if the overcoat layer-forming coating material (F) is an aqueous solution or aqueous dispersion, then there is a danger that the stability and/or pot life of the overcoat layer-forming coating material (F) may deteriorate.

For the above reasons, the overcoat layer-forming coating material (F) is preferably an organic solvent-based coating liquid. Here, the term "organic solvent-based coating liquid" means that solvents other than water represent at least 90% by mass, and preferably 95% by mass or greater, of the total quantity of solvent within the coating liquid.

Conventional organic solvents may be used as the solvent other than water, and examples include toluene, methyl ethyl ketone (MEK), cyclohexanone, Solvesso, isophorone, xylene, methyl isobutyl ketone (MIBK), ethyl acetate, propyl acetate, butyl acetate and isopropyl alcohol (IPA), although this is not an exhaustive list, and most conventional organic solvents may be used either alone, or in mixtures containing two or more different solvents.

From the viewpoint of achieving superior transparency following film formation, the monovalent metal compound (D) and/or bivalent or higher metal compound (E) is preferably in a finely powdered state at the time of mixing, and the average particle size is preferably not more than 10 μm, even more preferably not more than 3 μm, and is most preferably 1 μm or less.

Even if the powder is very fine, in those cases where the metal compound is used within a suspension, there is a danger that deposits or external appearance defects may occur upon drying, and consequently, using a fine powder dispersion that also includes a dispersant is preferred.

There are no particular restrictions on the dispersion device used for effecting dispersion, and examples include a paint conditioner (manufactured by Red Devil Equipment Co.), ball mill, sand mill (such as a "Dyno-mill" manufactured by Shinmaru Enterprises Corporation), attritor, pearl mill (such as a "DCP mill" manufactured by Eirich GmbH), coball mill, basket mill, homomixer, homogenizer, (such as "Clearmix" manufactured by M Technique Co., Ltd.), wet jet mill (such as a "Genus PY" manufactured by Genus Corporation) and a "nanomizer" manufactured by Nanomizer, Inc. Considering factors such as cost and processing ability, the use of a media-type dispersion device is preferred. Furthermore, examples of media that can be used include glass beads, zirconia beads, alumina beads, magnetic beads and stainless-steel beads.

In the case of the oxides, hydroxides and carbonates of Mg and Ca, which are particularly effective as the bivalent or higher metal compound (E), conducting dispersion using a dispersant (H) enables a transparent coating to be formed even if the quantity added of the metal compound is 65 parts by mass per 100 parts by mass of the resin solid fraction (or in those cases where a cross-linking agent is use, the combined solid fraction of the resin and the cross-linking agent) within the overcoat layer-forming coating material (F).

Known materials may be used as the dispersant (H), including the products listed below.

Products manufactured by BYK Chemie, including Disperbyk, or Disperbyk 101, 103, 107, 108, 110, 111, 116, 130, 140, 154, 161, 162, 163, 164, 165, 166, 170, 171, 174, 180, 181, 182, 183, 184, 185, 190, 191, 192, 2000 and 2001; Anti-Terra-U, 203 and 204; BYK-P104, P104S and 220S; Lactimon and Lactimon-WS; or Bykumon;

products manufactured by Avecia Ltd., including SOLSPERSE 3000, 9000, 13240, 13650, 13940, 17000, 18000, 20000, 21000, 24000, 26000, 27000, 28000, 31845, 32000, 32500, 32600, 34750, 36600, 38500, 41000, 41090, 43000, 44000 and 53095;

products manufactured by Efka Chemicals GmbH, including EFKA 46, 47, 48, 452, LP4008, 4009, LP4010, LP4050, LP4055, 400, 401, 402, 403, 450, 451, 453, 4540, 4550, LP4560, 120, 150, 1501, 1502 and 1503; and (poly)glycerol fatty acid esters, organic acid monoglycerides, sucrose fatty acid esters, lecithin, soybean polysaccharides, carboxymethylcellulose, sodium alginate, propylene glycol alginate, processed starch, guar gum, locust bean gum, xanthan gum, pectin, carrageenan, ghatti gum, curdlan, tamarind seed gum, karaya gum, tara gum, gellan gum, tragacanth gum, gum arabic, arabino galactan, alkyl phosphates, and polycarboxylic acid salts.

Of these, from the viewpoints of hygiene, dispersibility, and gas barrier properties, (poly)glycerol fatty acid esters and sucrose fatty acid esters are preferred, and (poly)glycerol fatty acid esters are particularly desirable.

These dispersants may be used either alone, or in combinations of two or more different products.

In terms of dispersibility, the (poly)glycerol fatty acid ester preferably has a polymerization degree of 1 to 20, and even more preferably 12 or less.

The fatty acid is preferably a saturated or unsaturated fatty acid of 10 to 22 carbon atoms, and specific examples include saturated fatty acids such as lauric acid, myristic acid, palmitic acid, stearic acid, arachic acid and docosanoic acid, and unsaturated fatty acids such as oleic acid, linolic acid, linoleic acid, erucic acid and arachidonic acid, although this is not an exhaustive list.

The HLB value for the (poly)glycerol fatty acid ester, in the case of a water-based system, is preferably 5 or greater, and even more preferably 7 or greater. When used in an organic solvent system, the HLB is preferably within a range from 2 to 15, and even more preferably from 4 to 13.

There are no particular restrictions on the method used for mixing the metal compound (or fine particle dispersion thereof) into the overcoat layer-forming coating material (F), and the resin that forms the coating material (F) and the metal compound may be mixed together and subsequently dispersed using a dispersion device described above, or the metal compound may be dispersed in advance using a dispersion device, and the resulting dispersion then mixed with the resin that forms the coating material (F).

More specific examples of the method include methods in which a solution containing the metal compound dissolved and/or dispersed therein is mixed with another solution containing the resin component of the coating material (F) dissolved within a solvent such as an organic solvent; methods in which a powder of the metal compound and/or a solution containing the metal compound dissolved therein is mixed with an emulsion containing the resin component of the overcoat layer-forming coating material (F) dispersed within a solvent; methods in which the resin and the metal compound are subjected to plastic mixing under heat, and subsequently used as a coating material; methods in which a powder of the metal compound is mixed with a solution or emulsion containing the resin component of the overcoat layer-forming coating material (F) dissolved or dispersed within a solvent, and the metal compound is then dispersed using a dispersion device; and methods in which the metal compound is dispersed in advance within an arbitrary solvent using a dispersion device, and the resulting dispersion is then mixed with a solution or emulsion containing the resin component of the overcoat layer-forming coating material (F) dissolved or dispersed within a solvent.

Of these, methods in which a powder of the metal compound and/or a solution containing the metal compound dissolved therein is mixed with an emulsion containing the resin component of the overcoat layer-forming coating material (F) dispersed within a solvent; and methods in which the metal compound is dispersed in advance within an arbitrary solvent using a dispersion device, and the resulting dispersion is then mixed with a solution or emulsion containing the resin component of the overcoat layer-forming coating material (F) dissolved or dispersed within a solvent are preferred as they enable comparatively uniform dispersion of the metal compound.

Examples of the resin used in forming the overcoat layer-forming coating material (F) include conventional urethane resins, polyester resins, acrylic resins, epoxy resins, alkyd resins, melamine resins, and amino resins. Of these, from the viewpoints of the water resistance, solvent resistance, heat resistance and curing temperature, urethane resins, polyester resins and acrylic resins are preferred, and urethane resins are particularly desirable.

Urethane resins are polymers obtained, for example, by a reaction between a polyfunctional isocyanate and a hydroxyl group-containing compound, and specific examples of urethane resins that can be used include those obtained by the reaction between a polyfunctional isocyanate, such as an aromatic polyisocyanate such as tolylene diisocyanate, diphenylmethane isocyanate or polymethylene polyphenylene polyisocyanate, or an aliphatic polyisocyanate such as hexamethylene diisocyanate or xylene isocyanate, and a hydroxyl group-containing compound such as a polyether polyol, polyester polyol, polyacrylate polyol or polycarbonate polyol.

The resins may be used either alone, or in mixtures containing two or more different resins.

The polyester resin is preferably a polyester polyol, examples of which include polyester polyols obtained by the reaction between a polyvalent carboxylic acid, a dialkyl ester thereof, or a mixture thereof, and a glycol or mixture of glycols.

Examples of the polyvalent carboxylic acid include aromatic polyvalent carboxylic acids such as isophthalic acid, terephthalic acid and naphthalenedicarboxylic acid, and aliphatic polyvalent carboxylic acids such as adipic acid, azelaic acid, sebacic acid and cyclohexanedicarboxylic acid.

Examples of the glycol include ethylene glycol, propylene glycol, diethylene glycol, butylene glycol, neopentyl glycol and 1,6-hexanediol.

These polyester polyols preferably have a glass transition temperature (hereafter referred to as "Tg") of not more than 120° C., even more preferably not more than 100° C., even more preferably not more than 80° C., and most preferably not more than 70° C.

Moreover, the number average molecular weight of these polyester polyols is preferably within a range from 1,000 to 100,000, even more preferably from 2,000 to 50,000, and most preferably from 3,000 to 40,000.

A cross-linking agent may also be added to the overcoat layer-forming coating material (F) to improve the water resistance and solvent resistance and the like of the formed overcoat layer (III). The cross-linking agent may be a cross-linking agent with self cross-linking properties, a compound that contains a plurality of functional groups within each molecule capable of reacting with carboxyl groups and/or hydroxyl groups, or a metal complex with polyvalent coordination sites. Of these, isocyanate compounds, melamine compounds, urea compounds, epoxy compounds and carbodiimide compounds are preferred, and isocyanate compounds are particularly desirable.

Specific examples include aromatic polyisocyanates such as tolylene diisocyanate, phenylene diisocyanate, diphenylmethane diisocyanate, naphthalene diisocyanate, xylylene diisocyanate and polymethylene polyphenylene polyisocyanate; aliphatic polyisocyanates such as tetramethylene diisocyanate, hexamethylene diisocyanate, dodecamethylene diisocyanate, trimethylhexamethylene diisocyanate, cyclohexylene diisocyanate, isophorone diisocyanate, dicyclohexylmethane diisocyanate and xylene isocyanate; polyfunctional polyisocyanate compounds such as isocyanurates, biurets and allophanates derived from the above polyisocyanate monomers; and polyfunctional polyisocyanate compounds containing terminal isocyanate groups, obtained through reaction with a trifunctional or higher polyol compound such as trimethylolpropane or glycerol.

The quantity added of the cross-linking agent is preferably within a range from 0.1 to 300 parts by mass, even more preferably from 1 to 100 parts by mass, and most preferably from 3 to 50 parts by mass, per 100 parts by mass of the resin solid fraction contained within the overcoat layer-forming coating material (F). If the quantity added of the cross-linking agent is less than 0.1 parts by mass, then the addition of the cross-linking agent yields no marked cross-linking effect compared with the case where no cross-linking agent is added, whereas if the quantity exceeds 300 parts by mass, then the cross-linking agent may actually impede the development of gas barrier properties, both of which are undesirable.

The overcoat layer-forming coating material (F) is a solution or dispersion in which water or an organic solvent is used as the solvent medium. As described above, from the viewpoints of the stability of the coating liquid, the pot life, and the water resistance, an organic solvent-based coating liquid is preferred as the coating material (F). Accordingly, the resin and cross-linking agent that form the coating material (F) are preferably soluble in organic solvents, and a combination of a polyester polyol with a Tg value of not more than 70° C. and a polyisocyanate is particularly preferred in terms of the coating properties, the productivity, and the physical properties required.

Additives such as heat stabilizers, antioxidants, reinforcing materials, pigments, age resistors, weatherproofing agents, flame retardants, plasticizers, release agents, and lubricants may also be incorporated within the overcoat layer-forming coating material (F), provided the addition of such materials does not significantly impair the characteristics of the coating material.

Examples of the above heat stabilizers, antioxidants and age resistors include hindered phenols, phosphorus compounds, hindered amines, sulfur compounds, copper compounds, alkali metal halides, and mixtures thereof.

Examples of reinforcing materials include clay, talc, calcium carbonate, zinc carbonate, wollastonite, silica, alumina, magnesium oxide, calcium silicate, sodium aluminate, sodium aluminosilicate, magnesium silicate, glass balloons, carbon black, zinc oxide, zeolite, hydrotalcite, metal fibers, metal whiskers, ceramic whiskers, potassium titanate whiskers, boron nitride, graphite, glass fiber, and carbon fiber.

The concentration (the solid fraction) of the overcoat layer-forming coating material (F) can be suitably adjusted in accordance with the specifications of the coating device, and/or the drying and heating device, although if the solution is overly dilute, then forming a layer, via reaction with the gas barrier layer (II), that is thick enough to ensure a satisfactory gas barrier property becomes difficult, and the subsequent drying process tends to require a long period of time. In contrast, if the concentration of the coating material (F) is too high, then achieving a homogenous coating material becomes difficult, and coatability problems tend to develop. Considering these factors, the concentration (the solid fraction) of the coating material (F) is preferably within a range from 5 to 50% by mass.

When forming the overcoat layer (III) from the overcoat layer-forming coating material (F), a heat treatment may be conducted immediately following application of the coating material (F) to the formed gas barrier layer (II), thereby forming a dried coating and conducting a heat treatment simultaneously, or alternatively, the moisture and the like may be evaporated following application to first form a dried coating, by blowing hot air using a dryer or the like, or by irradiating infrared radiation, and a heat treatment then conducted subsequently. In terms of shortening the process, conducting the heat treatment immediately following coating is preferred, provided this does not impair the state of the gas barrier layer (II) and the overcoat layer (III) or the physical properties such as the gas barrier property. There are no particular restrictions on the heat treatment method, and although conducting the heat treatment in a dry atmosphere such as an oven is considered typical, the heat treatment may also be conducted, for example, by bringing the coating into contact with a heated roller.

The thickness of the overcoat layer (III) formed on top of the gas barrier layer (II) varies depending on the thickness of the gas barrier layer (II), but in order to ensure favorable gas barrier properties via reaction with the gas barrier layer (II), the thickness of the overcoat layer (III) is preferably thicker than 0.1 μm, and from the viewpoints of productivity and cost, is preferably not more than 3 μm, is even more preferably within a range from 0.1 to 2 μm, and is most preferably from 0.15 to 1.5 μm.

There are no particular restrictions on the method used for applying the overcoat layer-forming coating material (F), and typical methods such as gravure roll coating, reverse roll coating, wire bar coating and air knife coating can be used.

The heat treatment conditions are affected by factors such as the blend ratio between the metal compound ((D) and/or (E)) and the resin, the existence of other added components, and the quantity of such added components if included, and although it is impossible to generalize regarding the ideal heat treatment temperature for forming the overcoat layer (III), the heat treatment is preferably conducted at a temperature within a range from 50 to 300° C., even more preferably from 70 to 250° C., and most preferably from 100 to 200° C. If the heat treatment temperature is too low, then the heat cross-linking reaction between the resin and the cross-linking agent within the overcoat layer-forming coating material (F) may not proceed satisfactorily, meaning adequate levels of adhesion, water resistance and heat resistance may be difficult to achieve, and the interaction between the metal compound and the polyalcohol-based polymer (A) and polycarboxylic acid-based polymer (B) within the gas barrier layer (II) may not proceed satisfactorily, making it difficult to obtain a laminate with satisfactory gas barrier properties. In contrast, if the heat treatment temperature is too high, then it is not preferable as there is a danger of wrinkling caused by film contraction, or coating brittleness.

From the viewpoint of productivity, the heat treatment time is preferably not longer than 5 minutes, is typically within a range from 1 second to 5 minutes, preferably from 3 seconds to 2 minutes, and even more preferably from 5 seconds to 1 minute. If the heat treatment time is too short, then the above interactions may not proceed satisfactorily, making it difficult to obtain a film with satisfactory adhesion, heat resistance, water resistance, and gas barrier properties.

<Top Coat Layer (IV)>

The top coat layer (IV) is a resin layer that is formed on top of the overcoat layer (III) using a top coat layer-forming coating material (G).

This top coat layer (IV) is preferably formed by applying the top coat layer-forming coating material (G) to the surface of the overcoat layer (III), and then conducting a heat treatment.

The application of the top coat layer-forming coating material (G) and the subsequent heat treatment are able to promote the reaction of the monovalent metal compound (D) and/or bivalent or higher metal compound (E) within the overcoat layer (III) with the polyalcohol-based polymer (A) or polycarboxylic acid-based polymer (B) within the gas barrier layer (II), thereby dramatically improving the gas barrier properties.

The top coat layer-forming coating material (G) may be an organic solvent-based coating liquid, an aqueous solution or an aqueous dispersion, although in order to ensure ionization of the monovalent metal compound (D) and/or bivalent or higher metal compound (E) contained within the overcoat layer (III), and subsequent reaction with the polyalcohol-based polymer (A) or polycarboxylic acid-based polymer (B) within the gas barrier layer (II), thereby introducing metal cross-linking into the gas barrier layer (II), the coating material (G) is preferably an aqueous solution or aqueous dispersion.

Although the oxygen gas permeability varies depending on the coating conditions, making it difficult to generalize, applying a top coat layer-forming coating material (G) in the form of an aqueous solution or aqueous dispersion and conducting a subsequent heat treatment typically reduces the oxygen gas permeability to approximately ½ to ¼ that observed for a structure with no top coat layer (IV), meaning the gas barrier properties can be improved. For example, the oxygen gas permeability measured under conditions including a temperature of 20° C. and a relative humidity of 85% RH is typically within a range from approximately 102 to 110 ml/m$^2$·24 h·MPa without a top coat layer (IV), but by providing a top coat layer (IV), this can be reduced to a value of not more than about 50 ml/m$^2$·24 h·MPa, and under ideal conditions, can be reduced to approximately 25 ml/m$^2$·24 h·MPa.

Moreover, the top coat layer (IV) also performs the role of protecting the overcoat layer (III).

Examples of the resin contained within the top coat layer-forming coating material (G) include conventional urethane resins, polyester resins, acrylic resins, epoxy resins, alkyd resins, melamine resins, and amino resins. Of these, from the viewpoints of the water resistance, solvent resistance, heat resistance and curing temperature, urethane resins, polyester resins and acrylic resins are preferred, and polyester resins and urethane resins are particularly desirable.

These resins may be used either alone, or in mixtures containing two or more different resins.

The urethane resin used in the above top coat layer-forming coating material (G) is a polymer obtained, for example, by a reaction between a polyfunctional isocyanate and a hydroxyl group-containing compound, and specific examples of urethane resins that can be used include those obtained by the reaction between a polyfunctional isocyanate, such as an aromatic polyisocyanate such as tolylene diisocyanate, diphenylmethane isocyanate or polymethylene polyphenylene polyisocyanate, or an aliphatic polyisocyanate such as hexamethylene diisocyanate or xylene isocyanate, and a hydroxyl group-containing compound such as a polyether polyol, polyester polyol, polyacrylate polyol or polycarbonate polyol.

The polyester resin is preferably a polyester polyol, examples of which include polyester polyols obtained by the reaction between a polyvalent carboxylic acid, a dialkyl ester thereof, or a mixture thereof, and a glycol or mixture of glycols.

Examples of the polyvalent carboxylic acid include aromatic polyvalent carboxylic acids such as isophthalic acid, terephthalic acid and naphthalenedicarboxylic acid, and aliphatic polyvalent carboxylic acids such as adipic acid, azelaic acid, sebacic acid and cyclohexanedicarboxylic acid.

Examples of the glycol include ethylene glycol, propylene glycol, diethylene glycol, butylene glycol, neopentyl glycol and 1,6-hexanediol.

A cross-linking agent may also be added to the coating material (G) to improve the water resistance and solvent resistance and the like of the formed top coat layer (IV). The cross-linking agent may be a cross-linking agent with self cross-linking properties, a compound that contains a plurality of functional groups within each molecule capable of reacting with carboxyl groups and/or hydroxyl groups, or a metal complex with polyvalent coordination sites. Of these, isocyanate compounds, melamine compounds, urea compounds, epoxy compounds and carbodiimide compounds are preferred, and isocyanate compounds are particularly desirable.

Specific examples include aromatic polyisocyanates such as tolylene diisocyanate, phenylene diisocyanate, diphenylmethane diisocyanate, naphthalene diisocyanate, xylylene diisocyanate and polymethylene polyphenylene polyisocyanate; aliphatic polyisocyanates such as tetramethylene diisocyanate, hexamethylene diisocyanate, dodecamethylene diisocyanate, trimethylhexamethylene diisocyanate, cyclohexylene diisocyanate, isophorone diisocyanate, dicyclohexylmethane diisocyanate and xylene isocyanate; polyfunctional polyisocyanate compounds such as isocyanurates, biurets, and allophanates derived from the above polyisocyanate monomers; and polyfunctional polyisocyanate compounds containing terminal isocyanate groups, obtained through reaction with a trifunctional or higher polyol compound such as trimethylolpropane or glycerol.

The quantity added of the cross-linking agent is preferably within a range from 0.1 to 300 parts by mass, even more preferably from 1 to 100 parts by mass, and most preferably from 3 to 50 parts by mass, per 100 parts by mass of the resin solid fraction contained within the coating material (G).

The additives described above that are suitable for addition to the overcoat layer-forming coating material (F) may also be added, in a similar manner, to the top coat layer-forming coating material (G).

The concentration (the solid fraction) of the top coat layer-forming coating material (G) can be suitably adjusted in accordance with the specifications of the coating device, and/or the drying and heating device, but is preferably within a range from 5 to 50% by mass.

When forming the top coat layer (IV) from the top coat layer-forming coating material (G), a heat treatment is preferably conducted immediately following application of the coating material (G).

Considering factors such as shortening the production process and improving the productivity, the top coat layer is preferably formed in a continuous manner together with the formation of the overcoat layer. In other words, following formation of the overcoat layer (III) and subsequent formation of the top coat layer (IV), the heat treatment of the two layers (III) and (IV) is preferably conducted simultaneously.

There are no particular restrictions on the heat treatment method for the top coat layer (IV), and although conducting the heat treatment in a dry atmosphere such as an oven is considered typical, the heat treatment may also be conducted, for example, by bringing the coating into contact with a heated roller.

Although it is impossible to generalize regarding the ideal heat treatment temperature for forming the top coat layer (IV), the heat treatment is preferably conducted at a temperature within a range from 50 to 300° C., even more preferably from 70 to 250° C., and most preferably from 100 to 200° C. If the heat treatment temperature is too low, then the heat cross-linking reaction between the resin and the cross-linking agent within the coating material (G) may not proceed satisfactorily, meaning adequate levels of adhesion, water resistance and heat resistance may be difficult to achieve. In contrast, if the heat treatment temperature is too high, then it is not preferable as there is a danger of wrinkling caused by film contraction, or coating brittleness.

The heat treatment time is preferably not longer than 5 minutes, is typically within a range from 1 second to 5 minutes, preferably from 3 seconds to 2 minutes, and even more preferably from 5 seconds to 1 minute. If the heat treatment time is too short, then the above reactions may not proceed satisfactorily, making it difficult to obtain a film with satisfactory adhesion, heat resistance, water resistance, and gas barrier properties, whereas if the time is too long, the productivity deteriorates.

The thickness of the top coat layer (IV) is preferably thicker than 0.1 μm, and from the viewpoints of productivity and cost, is preferably not more than approximately 3 μm, is even more preferably within a range from 0.1 to 2 μm, and is most preferably from 0.15 to 1.5 μm.

There are no particular restrictions on the method used for applying the top coat layer-forming coating material (G), and common methods such as those described above for application of the overcoat layer-forming coating material (F) can be used.

In order to ensure that the metal compound contained within the overcoat layer (III) interacts effectively with the polyalcohol-based polymer (A) and the polycarboxylic acid-based polymer (B) contained within the gas barrier layer (II), it is important that the layers (II), (III) and (IV) are in direct mutual contact. Accordingly, the plastic substrate (I), the gas barrier layer (II), the overcoat layer (III) and the top coat layer (IV) must be laminated in the order (I) (II) (III) (IV). The fact that an anchor coat layer may be included between (I) and (II) is as described above.

<Laminated Product>

The gas barrier laminate according to the present invention may also include a laminate adhesive layer (V), laminated either directly on top of the top coat layer (IV) or with a printing ink layer disposed therebetween, as well as a heat seal layer (VI) laminated to the top of the laminate adhesive layer (V), thereby forming a laminated product in which the layers are laminated in the order (I) (II) (III) (IV) (V) (VI) or (I) (II) (III) (IV) (printing ink layer) (V) (VI); or may include a laminate adhesive layer (V), laminated either directly to the substrate (I) or with a printing ink layer disposed therebetween, as well as a heat seal layer (VI) laminated to the top of the laminate adhesive layer (V), thereby forming a laminated product in which the layers are laminated in the order (VI) (V) (I) (II) (III) (IV) or (VI) (V) (printing ink layer) (I) (II) (III) (IV). However, in terms of the scratch resistance and abrasion resistance of the laminated product, the structures (I) (II) (III) (IV) (V) (VI) and (I) (II) (III) (IV) (printing ink layer) (V) (VI) are preferred. In some cases, a functional layer such as a primer layer or an antistatic layer may also be formed between the top coat layer (IV) and the laminate adhesive layer (V), or between the plastic substrate (I) and the laminate adhesive layer (V) of the gas barrier laminate. Alternatively, a surface treatment such as a corona treatment or ozone treatment may be conducted between the top coat layer (IV) and the laminate adhesive layer (V) (the mutually contacting surfaces), or between the plastic substrate (I) and the laminate adhesive layer (V) (the mutually contacting surfaces) of the gas barrier laminate, in order to improve the adhesion.

<Printing Ink Layer>

The printing ink layer is a printed layer of ink, and comprises text or a picture or the like formed using an ink. Examples of inks that can be used include conventional inks comprising an ink binder resin such as a urethane-based, acrylic-based, nitrocellulose-based, rubber-based or vinyl chloride-based resin, to which have been added various pigments, extender pigments, and additives such as plasticizers, drying agents and stabilizers.

Examples of the method used for forming the printing ink layer include, for example, conventional printing methods such as offset printing methods, gravure printing methods and silk screen printing methods, as well as conventional coating methods such as roll coating, knife edge coating, and gravure coating.

<Laminate Adhesive Layer (V)>

The laminate adhesive layer (V) is a layer that is used for improving the adhesion between the heat seal layer (VI) and the layer that contacts the heat seal layer via the laminate adhesive layer (V).

The coating agent used in forming the laminate adhesive layer (V) can use conventional materials. Examples include isocyanate-based, polyurethane-based, polyester-based, polyethyleneimine-based, polybutadiene-based, polyolefin-based and alkyl titanate-based coating agents. Of these, in view of achieving effects such as adhesion, heat resistance and water resistance, isocyanate-based, polyurethane-based and polyester-based coating agents are preferred. Moreover, mixtures and reaction products of either one, or two or more isocyanate compounds, polyurethanes or urethane prepolymers; mixtures and reaction products of one, or two or more polyesters, polyols or polyethers, and an isocyanate; or solutions or dispersions thereof are preferred.

In order to satisfactorily enhance the adhesion of the heat seal layer, the thickness of the laminate adhesive layer (V) is preferably thicker than 0.1 μm, whereas from the viewpoint of productivity, is preferably no thicker than approximately 10 μm.

<Heat Seal Layer (VI)>

The heat seal layer (VI) is a layer that is provided as a heat-bondable layer used when forming a bag-shaped package or the like, and employs a material that is able to be sealed by heat or high frequency radiation or the like. Examples of this material include low-density polyethylene, straight-chain low-density polyethylene, high-density polyethylene, ethylene-vinyl acetate copolymers, polypropylene, ethylene-acrylic acid copolymers, ethylene-acrylic acid salt copolymers, and ethylene-acrylate copolymers.

The thickness is determined in accordance with the intended purpose, but is typically within a range from 15 to 200 μm.

Conventional methods can be used for forming the laminate adhesive layer (V) and the heat seal layer (VI). Examples include lamination methods such as dry lamination methods, wet lamination methods, solventless dry lamination methods and extrusion lamination methods; co-extrusion methods in which two or more resin layers are extruded simultaneously, and coating methods in which a film is generated using a coater or the like. Considering factors such as the adhesion, heat resistance and water resistance, dry lamination methods are preferred.

The laminate or laminated product may also be treated under a humid atmosphere in order to enhance the gas barrier properties of the laminate or laminated product. Conducting a humidification treatment enables further acceleration of the interaction between the metal compound ((D) and/or (E)), and the polyalcohol-based polymer (A) and polycarboxylic acid-based polymer (B) of the gas barrier layer (II). This humidification treatment may be conducted by leaving the laminate or laminated product to stand in a high temperature, high humidity atmosphere, or by bringing the laminate or laminated product into contact with water at a high temperature. The humidification treatment conditions vary depending on the purpose, but in those cases where the laminate or laminated product is left to stand in a high temperature, high humidity atmosphere, a temperature of 30 to 130° C. and a relative humidity of 50 to 100% are preferred. In those cases where the laminate or laminated product is brought into contact with water at a high temperature, a temperature of approximately 30 to 130° C. (under pressure for temperatures of 100° C. or higher) is preferred. If the temperature is too low, then the effect of the humidification treatment is inadequate, whereas if the temperature is too high, the substrate may be subjected to heat damage, both of which are undesirable. The time for the humidification treatment varies depending on the treatment conditions, but is generally selected within a range from several seconds to several hundred hours.

The laminate or laminated product according to the present invention can be employed in all manner of fields that require favorable gas barrier properties or lamination strength following boiling treatment. For example, the laminate can be used favorably for all manner of packaging materials, and is particularly suited for packaging foodstuffs.

EXAMPLES

As follows is a description of specifics of the present invention, based on a series of examples and comparative examples, although the present invention is not limited solely to these examples.

<Oxygen Gas Barrier Property>

The oxygen gas barrier property was evaluated by measuring the oxygen permeability under an atmosphere at a temperature of 20° C. and a relative humidity of 85%, using an oxygen barrier measurement device (OX-TRAN 2/20) manufactured by Mocon, Inc. Using the measured results for the oxygen permeability of the gas barrier laminate and the substrate, the oxygen permeability of the formed layers comprising the gas barrier layer (II), the overcoat layer (III) and the top coat layer (IV) was calculated using the following formula.

$$1/P_{total} = 1/P_I + 1/P_{II+III+IV}$$

In this formula, $P_{total}$ (a measured value): the oxygen permeability of the gas barrier laminate (the laminated film)

$P_I$ (a measured value): the oxygen permeability of the plastic substrate (I)

$P_{II+III+IV}$ (a calculated value): the oxygen permeability of the formed layers comprising the gas barrier layer (II), the overcoat layer (III) and the top coat layer (IV)

<Laminate External Appearance>

A laminate was prepared by forming an overcoat layer and a top coat layer on top of the gas barrier layer, the laminate was aged for 3 days at 40° C., and the external appearance of the laminate was then evaluated visually. The laminate was evaluated using a 5-point scale in which a colorless, transparent laminate was graded as 5, and a laminate with significant white cloudiness was graded as 1.

<Laminated Product Lamination Strength>

A test piece with dimensions of length: 100 mm×width: 15 mm was prepared from the obtained laminated product, and the lamination strength was measured at a peel speed of 300 mm/minute using a T-type peel test, under conditions including a temperature of 20° C. and a relative humidity of 65%.

Production Example 1

A PVA (Poval 105, manufactured by Kuraray Co., Ltd., (polyvinyl saponification degree: 98 to 99%, average polymerization degree: 500) was dissolved in hot water, and then cooled to room temperature, thus forming a PVA aqueous solution with a solid fraction of 15% by mass.

Production Example 2

An EMA (weight average molecular weight: 60,000, maleic acid units: 45 to 50%) and sodium hydroxide were dissolved in hot water, and then cooled to room temperature, thus forming an EMA aqueous solution with a solid fraction of 15% by mass in which 10 mol % of the carboxyl groups had been neutralized with sodium hydroxide.

Production Example 3

Using a polyacrylic acid (A10H, manufactured by Toagosei Co., Ltd., number average molecular weight: 200,000, 25% by mass aqueous solution) and sodium hydroxide, a polyacrylic acid (hereafter abbreviated as PAA) aqueous solution with a solid fraction of 15% by mass in which 10 mol % of the carboxyl groups had been neutralized with sodium hydroxide was obtained.

Production Example 4

A Pullulan (PF-20, manufactured by Hayashibara Group) was dissolved in water, forming a pullulan aqueous solution with a solid fraction of 15% by mass.

Production Example 5

A polyester (Vylon GK130, manufactured by Toyobo Co., Ltd., film elongation: 1,000%, Tg: 15° C., number average molecular weight: 7,000) was dissolved in a toluene/ethyl acetate/MEK mixed solvent (mass ratio: 3/2/1), thus forming a Vylon GK130 polyester solution with a solid fraction of 15% by mass.

Production Example 6

A polyester (Vylon 600, manufactured by Toyobo Co., Ltd., film elongation: 4%, Tg: 47° C., number average molecular weight: 16,000) was dissolved in a toluene/ethyl acetate/MEK mixed solvent (mass ratio: 3/2/1), thus forming a Vylon 600 polyester solution with a solid fraction of 15% by mass.

Production Example 7

A polyester (Vylon 226, manufactured by Toyobo Co., Ltd., film elongation: too low to be measured, Tg: 65° C., number average molecular weight: 8,000) was dissolved in an ethyl acetate/MEK mixed solvent (mass ratio: 2/1), thus forming a Vylon 226 polyester solution with a solid fraction of 15% by mass.

Production Example 8

To a suspended toluene solution of a magnesium oxide powder (average particle size: 3.5 μm, crystallite diameter: 0.01 μm, BET specific surface area: 145 m$^2$/g) was added sufficient quantity of a dispersant (decaglycerol oleic acid ester, HLB=7) to provide 25 parts by mass per 100 parts by mass of the magnesium oxide, and following stirring with a stirrer, the mixture was dispersed using a beads mill, thereby yielding a magnesium oxide dispersed solution (1) with a solid fraction of 20% by mass.

Production Example 9

To a suspended aqueous solution of a magnesium oxide powder (average particle size: 3.5 μm, crystallite diameter: 0.01 μm, BET specific surface area: 145 m$^2$/g) was added sufficient quantity of a dispersant (Nopcosperse 44C, a neutralized product of sodium polyacrylate, manufactured by San Nopco Ltd.) to provide 35 parts by mass per 100 parts by mass of the magnesium oxide, and following stirring with a stirrer, the mixture was dispersed using a beads mill, thereby yielding a magnesium oxide dispersed aqueous solution (2) with a solid fraction of 20% by mass.

Example 1

The PVA aqueous solution of the production example 1 and the EMA aqueous solution of the production example 2 were mixed together so that the mass ratio between the PVA and EMA (the solid fractions) was 30/70, thereby yielding a mixed liquid (a gas barrier layer-forming coating material) with a solid fraction of 10% by mass. The mixed solution was applied to the surface of a biaxially stretched nylon film (thickness: 15 μm) using a bar coater No. 4, was subsequently dried for 2 minutes at 80° C. in an electric oven, and was then subjected to further drying and a heat treatment for 20 seconds at 200° C. in an electric oven, thus forming a gas barrier layer (II) with a thickness of 0.5 μm.

To the magnesium oxide dispersed solution (1) of the production example 8 were added sufficient quantities of the Vylon GK130 polyester solution of the production example 5 and a polyisocyanate compound (BXX4773, manufactured by Toyo Ink Mfg. Co., Ltd.) to generate a mass ratio of magnesium oxide/polyester/polyisocyanate of 20/83.3/16.7, a 1% by mass ethyl acetate solution of dioctyltin laurate (STAN SNT-1F, manufactured by Sankyo Organic Chemicals Co., Ltd.) was added as a catalyst, and toluene was also added, yielding a mixed liquid (an overcoat layer-forming coating material) with a solid fraction of 10% by mass.

The above overcoat layer-forming coating material was applied to the surface of the prepared gas barrier layer (II) using a bar coater No. 4, and was then subjected to drying and a heat treatment for 30 seconds at 80° C. in an electric oven, thus forming an overcoat layer (III) with a thickness of 0.7 μm.

An aqueous polyurethane (WS5100, manufactured by Mitsui Takeda Chemical Co., Ltd., 30% by mass aqueous solution) was prepared, thereby forming a mixed liquid (a top coat layer-forming coating material) with a solid fraction of 7.5% by mass.

The top coat layer-forming coating material was applied to the above overcoat layer (III) using a bar coater No. 6, and was then subjected to drying and a heat treatment for 2 minutes at 100° C. in an electric oven, thus forming a top coat layer (IV) with a thickness of 0.7 μm. An aging treatment was then conducted for 3 days at 40° C., yielding a gas barrier laminate in which the layers were laminated in the order (I) (II) (III) (IV).

The results of evaluating the external appearance and measuring the oxygen gas permeability of this laminate are shown in Table 1.

A dry laminator was used to coat the surface of the layer (IV) of the gas barrier laminate with a sufficient quantity of TES4644/TCS4645 manufactured by Toyo Morton, Ltd. to form a dried film thickness of 3 μm, thus forming a laminate adhesive layer (V). This adhesive layer (V) was then bonded to a heat seal layer (VI) (LLDPE, TUX-FCD manufactured by Tohcello Co., Ltd., thickness: 50 μm), and aging was conducted for 3 days at 40° C., thereby curing the adhesive layer (V) and generating a laminated product in which the layers were laminated in the order (I) (II) (III) (IV) (V) (VI). The result of measuring the lamination strength of this laminated product is shown in Table 1.

Example 2

With the exception of altering the mass ratio between the magnesium oxide dispersed solution (1), the Vylon GK130 polyester solution, and the polyisocyanate compound to a ratio in which magnesium oxide/polyester/polyisocyanate is equal to 50/83.3/16.7, a gas barrier laminate and a laminated product were obtained in the same manner as the example 1.

Example 3

With the exception of replacing the magnesium oxide dispersed solution (1) with a magnesium oxide powder, a gas barrier laminate and a laminated product were obtained in the same manner as the example 1.

Example 4

With the exception of replacing the polycarboxylic acid-based polymer (B) used in forming the gas barrier layer-forming coating material (C) with the PAA aqueous solution of the production example 3, a gas barrier laminate and a laminated product were obtained in the same manner as the example 1.

Example 5

With the exception of replacing the polyalcohol-based polymer (A) used in forming the gas barrier layer-forming coating material (C) with the pullulan aqueous solution of the production example 4, a gas barrier laminate and a laminated product were obtained in the same manner as the example 1.

Example 6

The Vylon 226 polyester solution of the production example 7 and a polyisocyanate compound (Sumijule 3300, manufactured by Sumitomo Chemical Co., Ltd.) were mixed together to generate a mass ratio of polyester/polyisocyanate of 83.3/16.7, a 1% by mass ethyl acetate solution of dioctyltin laurate (STANN SNT-1F, manufactured by Sankyo Organic Chemicals Co., Ltd.) was added as a catalyst, and toluene, ethyl acetate and MEK were also added and mixed, yielding a mixed liquid (a top coat layer-forming coating material) with a solid fraction of 7.5% by mass.

With the exceptions of using this top coat layer-forming coating material, and altering the drying and heat treatment conditions for formation of the top coat layer to 30 seconds at 80° C., a gas barrier laminate and a laminated product were obtained in the same manner as the example 1.

Example 7

To the magnesium oxide dispersed aqueous solution (2) of the production example 9 were added sufficient quantities of an aqueous polyurethane (W635, manufactured by Mitsui Takeda Chemical Co., Ltd.) and an aqueous dispersed solution of a polyisocyanate compound (Aquanate 100, manufactured by Nippon Kayaku Co., Ltd.) to generate a mass ratio of magnesium oxide/polyurethane/polyisocyanate of 20/83.3/16.7, thereby yielding a mixed liquid (an overcoat layer-forming coating material) with a solid fraction of 10% by mass.

With the exceptions of using this overcoat layer-forming coating material, and altering the drying and heat treatment conditions for formation of the overcoat layer to 2 minutes at 120° C., a gas barrier laminate and a laminated product were obtained in the same manner as the example 1.

Example 8

With the exception of using a calcium carbonate dispersed aqueous solution (Calmin ML, manufactured by Takehara Kagaku Kogyo Co., Ltd.), a gas barrier laminate and a laminated product were obtained in the same manner as the example 7.

Example 9

With the exception of using a zinc oxide dispersed aqueous solution (ZW143, manufactured by Sumitomo Osaka Cement Co., Ltd.), a gas barrier laminate and a laminated product were obtained in the same manner as the example 7.

Example 10

Lithium carbonate salt, an aqueous polyurethane (Superflex 460, manufactured by Dai-ichi Kogyo Seiyaku Co., Ltd.), and a polyisocyanate compound (HW-100, manufactured by BASF Corporation) were mixed in a mass ratio of 15/70/30, thereby yielding a mixed liquid (an overcoat layer-forming coating material) with a coating material resin solid fraction of 10% by mass.

With the exception of using this overcoat layer-forming coating material, a gas barrier laminate and a laminated product were obtained in the same manner as the example 7.

Example 11

Using the magnesium oxide dispersed aqueous solution (2) of the production example 9, lithium carbonate salt, an aqueous polyurethane (Superflex 460, manufactured by Dai-ichi Kogyo Seiyaku Co., Ltd.), and a polyisocyanate compound (HW-100, manufactured by BASF Corporation), the components were mixed together to generate a mass ratio of magnesium oxide/lithium carbonate/polyurethane/polyisocyanate of 15/5/70/30, thereby yielding a mixed liquid (an overcoat layer-forming coating material) with a coating material resin solid fraction of 10% by mass.

With the exception of using this overcoat layer-forming coating material, a gas barrier laminate and a laminated product were obtained in the same manner as the example 7.

Example 12

With the exception of altering the resin used in forming the overcoat layer-forming coating material (F) to a polyurethane solution UR5537 (manufactured by Toyobo Co., Ltd., film elongation: 200%, Tg: 34° C., number average molecular weight: 20,000), a gas barrier laminate and a laminated product were obtained in the same manner as the example 1.

Example 13

With the exception of altering the polyester used in forming the overcoat layer-forming coating material (F) to the Vylon 600 polyester solution of the production example 6, a gas barrier laminate and a laminated product were obtained in the same manner as the example 1.

Example 14

With the exception of adjusting the solid fractions of the coating materials, and thereby altering the film thickness values for the gas barrier layer/overcoat layer/top coat layer to 0.3 μm/0.4 μm/0.4 μm, a gas barrier laminate and a laminated product were obtained in the same manner as the example 1.

Example 15

With the exception of adjusting the solid fractions of the coating materials, and thereby altering the film thickness values for the gas barrier layer/overcoat layer/top coat layer to 0.3 μm/0.4 μm/0.4 μm, a gas barrier laminate and a laminated product were obtained in the same manner as the example 2.

Example 16

A gas barrier laminate prepared in the same manner as the example 1 was left to stand for 7 days in an atmosphere at 50° C. and 95% RH, and the laminate was then evaluated for external appearance and measured for oxygen gas permeability.

Example 17

A gas barrier laminate prepared in the same manner as the example 2 was left to stand for 7 days in an atmosphere at 50°

C. and 95% RH, and the laminate was then evaluated for external appearance and measured for oxygen gas permeability.

Comparative Example 1

With the exception of not including the magnesium oxide dispersed solution (1) of the production example 7, and mixing the Vylon GK130 polyester solution and the polyisocyanate such that the mass ratio of polyester/polyisocyanate is equal to 83.3/16.7, a gas barrier laminate and a laminated product were obtained in the same manner as the example 1.

Comparative Example 2

With the exception of not providing the top coat layer (IV), a gas barrier laminate with the layers laminated in the order (I) (II) (III), and a laminated product with the layers laminated in the order (I) (II) (III) (V) (VI) were prepared in the same manner as the example 1.

Comparative Example 3

With the exception of replacing the magnesium oxide dispersed solution (1) with a magnesium oxide powder, a gas barrier laminate with the layers laminated in the order (I) (II) (III), and a laminated product with the layers laminated in the order (I) (II) (III) (V) (VI) were prepared in the same manner as the comparative example 2.

Comparative Example 4

With the exception of not providing the overcoat layer (III) and the top coat layer (IV), a gas barrier laminate with the layers laminated in the order (I) (II), and a laminated product with the layers laminated in the order (I) (II) (V) (VI) were prepared in the same manner as the example 1.

Comparative Example 5

With the exception of not providing the overcoat layer (III), a gas barrier laminate with the layers laminated in the order (I) (II) (IV), and a laminated product with the layers laminated in the order (I) (II) (IV) (V) (VI) were prepared in the same manner as the example 1.

The results of visually evaluating the external appearance and measuring the oxygen gas permeability for each of the laminates obtained in the above examples and comparative examples, and the results of measuring the lamination strength for each of the laminated products are shown in Table 1.

TABLE 1

| | Gas barrier layer (II) | | | Overcoat layer (III) | | | |
| | Coating material (C) | Film | | Coating material (F) | Metal compound | | Film |
| | resin composition | thickness (μm) | Solvent | resin composition | Metal | Parts by mass (*) | thickness (μm) |
|---|---|---|---|---|---|---|---|
| Example 1 | PVA/EMA | 0.5 | Organic solvent | Polyester/poly-isocyanate | MgO dispersion | 20 | 0.7 |
| Example 2 | | | | | | 50 | |
| Example 3 | | | | | MgO fine powder | 20 | |
| Example 4 | | | | | MgO dispersion | | |
| Example 5 | Pullulan/PAA | | | | | | |
| Example 6 | PVA/EMA | | | | | | |
| Example 7 | | | Aqueous | Polyurethane/poly-isocyanate | | | |
| Example 8 | | | | | CaCO3 dispersion | 50 | |
| Example 9 | | | | | ZnO dispersion | 40 | |
| Example 10 | | | | | Li2CO3 | 15 | |
| Example 11 | | | | | Li2CO3/MgO dispersion | 5 15 | |
| Example 12 | | | Organic solvent | Polyurethane/poly-isocyanate | MgO dispersion | 20 | |
| Example 13 | | | Organic solvent | Polyester/poly-isocyanate | MgO dispersion | 20 | |
| Example 14 | | 0.3 | | | | 20 | 0.4 |
| Example 15 | | | | | | 50 | |
| Example 16 | | 0.5 | | | | 20 | 0.7 |
| Example 17 | | | | | | 50 | |
| Comparative example 1 | PVA/EMA | 0.5 | Organic solvent | Polyester/poly-isocyanate | — | — | 0.7 |
| Comparative example 2 | | | | | MgO dispersion | 20 | |
| Comparative example 3 | | | | | MgO fine powder | | |
| Comparative example 4 | | | | | None | | |
| Comparative example 5 | | | | | None | | |

TABLE 1-continued

| | Top coat layer (IV) | | | Laminate | |
|---|---|---|---|---|---|
| | | | | Oxygen gas permeability | Laminated product |
| | Solvent | Coating resin composition | Film thickness (μm) | External appearance | (Ptotal) (ml/m2·day·MPa) | Lamination strength (N/cm) |
| Example 1 | Aqueous | Poly-urethane | 0.7 | 5 | 25.5 | 6.2 |
| Example 2 | | | | 5 | 20.2 | 6.5 |
| Example 3 | | | | 4 | 25.2 | 5.9 |
| Example 4 | | | | 5 | 33.4 | 5.6 |
| Example 5 | | | | 5 | 36.1 | 5.6 |
| Example 6 | Organic solvent | Polyester/poly-isocyanate | | 5 | 45.2 | 6.5 |
| Example 7 | Aqueous | Poly-urethane | | 5 | 20.9 | 3.9 |
| Example 8 | | | | 4 | 35.5 | 3.6 |
| Example 9 | | | | 4 | 45.3 | 3.9 |
| Example 10 | | | | 5 | 20.9 | 2.0 |
| Example 11 | | | | 5 | 10.8 | 2.3 |
| Example 12 | | | | 5 | 23.6 | Peel-off Impossible |
| Example 13 | | | | 5 | 24.2 | 7.8 |
| Example 14 | | | 0.4 | 5 | 18.0 | 9.8 |
| Example 15 | | | | 5 | 12.7 | 6.9 |
| Example 16 | | | 0.7 | 5() | 1.9() | — |
| Example 17 | | | | 5() | 1.2() | — |
| Comparative example 1 | Aqueous | Poly-urethane | 0.7 | 5 | 261.0 | 6.5 |
| Comparative example 2 | | None | | 5 | 110.0 | 6.2 |
| Comparative example 3 | | None | | 1 | 102.0 | 5.9 |
| Comparative example 4 | | None | | 5 | 265.0 | 5.9 |
| Comparative example 5 | Aqueous | Poly-urethane | 0.7 | 5 | 249.0 | 1.3 |

(*)Quantity (or solid fraction quantity in the case of a dispersion) relative to 100 parts by mass of the combined solid fraction of resin and cross-linking agent.
(**)Evaluation following standing for 7 days in an atmosphere at 50° C. and 95% RH.

The gas barrier laminates obtained in the above examples all had a favorable external appearance, exhibited superior gas barrier properties, and yielded a laminated product with superior lamination strength. In contrast, in the comparative examples 1 to 5, because the laminate lacked the specified overcoat layer (III) and/or top coat layer (IV), satisfactory gas barrier properties could not be achieved.

The invention claimed is:

1. A gas barrier laminate comprising:
a plastic substrate;
a gas barrier layer formed from a gas barrier layer-forming coating material (C) comprising a polyalcohol-based polymer (A) and a polycarboxylic acid-based polymer (B);
an overcoat layer formed from an overcoat layer-forming coating material (F) comprising at least one of a monovalent metal compound (D) and a bivalent or higher metal compound (E); and
a top coat layer formed from a top coat layer-forming coating material (G); wherein the top coat layer-forming coating material (G) is an aqueous solution or an aqueous dispersion and wherein the top coat layer-forming coating material (G) comprises a urethane resin obtained by a process comprising reacting a polyfunctional isocyanate and a hydroxyl group-containing compound, and wherein
the gas barrier layer is laminated to the plastic substrate, either directly or with an anchor coat layer disposed therebetween, the overcoat layer is laminated on top of the gas barrier layer, and the top coat layer is formed on top of the overcoat layer.

2. The gas bather laminate according to either claim 1, wherein the overcoat layer-forming coating material (F) is an organic solvent-based coating liquid.

3. The gas barrier laminate according to claim 1, wherein the polyalcohol-based polymer (A) comprises at least one polymer selected from the group consisting of polyvinyl alcohol, a copolymer of ethylene and vinyl alcohol, and a sugar.

4. The gas barrier laminate according to claim 1, wherein the polycarboxylic acid-based polymer (B) comprises at least one of an olefin-maleic acid copolymer and a poly(meth) acrylic acid.

5. The gas barrier laminate according to claim 1, wherein the overcoat layer comprises a polyester polyol with a glass transition temperature of not more than 70° C., and a polyisocyanate.

6. The gas barrier laminate according to claim 1, wherein the bivalent or higher metal compound (E) comprises at least one of a hydroxide, oxide and carbonate of at least one metal selected from the group consisting of Mg and Ca.

7. The gas barrier laminate according to claim 6, wherein the bivalent or higher metal compound (E) is dispersed within the overcoat layer-forming coating material (F) using a dispersant (H).

8. A laminated product, comprising:
the gas barrier laminate according to claim 1;
a laminate adhesive layer; and a heat seal layer; wherein
the laminate adhesive layer is laminated to either the top coat layer or the plastic substrate of the gas barrier laminate, either directly or with a printing ink layer disposed therebetween, and the heat seal layer is laminated to the top of the laminate adhesive layer.

9. A packaging material comprising the gas barrier laminate according to claim 1.

10. The gas barrier laminate according to claim 1, wherein the ratio of the polyalcohol-based polymer (A) to the polycarboxylic acid-based polymer (B) is such that the molar ratio between OH groups and COOH groups (OH groups/COOH groups) is from 0.01 to 20.

11. The gas barrier laminate according to claim 3, wherein the saponification degree of the polyvinyl alcohol or copolymer of ethylene and vinyl alcohol is not less than 95 mol %.

12. The gas barrier laminate according to claim 3, wherein the average polymerization degree of the polyvinyl alcohol or copolymer of ethylene and vinyl alcohol is within a range from 50 to 4,000.

13. The gas barrier laminate according to claim 3, wherein the gas barrier-forming coating material (C) comprises a cross-linking agent.

14. The gas barrier laminate according to claim 1, wherein the monovalent metal compound (D) is at least one metal compound selected from the group consisting of Li, Na, K, Rb and Se.

15. The gas barrier laminate according to claim 1, wherein the bivalent or higher metal compound (E) is at least one metal selected from the group consisting of Mg, Ca, Zn, Cu, Co, Fe, Ni, Al, and Zr.

16. The gas barrier laminate according to claim 1, wherein the top coat layer-forming coating material (G) comprises at least one resin selected from the group consisting of urethane resin, polyester resin, acrylic resin, epoxy resin, alkyd resin, melamine resin, and amino resin.

17. The gas barrier laminate according to claim 1, wherein the top coat layer-forming coating material (G) comprises a polyester polyol.

18. The gas barrier laminate according to claim 1, wherein the top coat layer-forming coating material (G) is subjected to a heat treatment.

19. A method for producing a gas barrier laminate, comprising:
forming a gas barrier layer on a plastic substrate, either directly or with an anchor coat layer disposed therebetween, using a gas barrier layer-forming coating material (C) containing a polyalcohol-based polymer (A) and a polycarboxylic acid-based polymer (B);
forming an overcoat layer on top of the gas barrier layer using an overcoat layer-forming coating material (F) containing at least one of a monovalent metal compound (D) and a bivalent or higher metal compound (E); and
forming a top coat layer on top of the overcoat layer using a top coat layer-forming coating material (G); wherein the top coat layer-forming coating material (G) is an aqueous solution or an aqueous dispersion and wherein the top coat layer-forming coating material (G) comprises a urethane resin obtained by a process comprising reacting a polyfunctional isocyanate and a hydroxyl group-containing compound.

* * * * *